(12) United States Patent
Miyazaki et al.

(10) Patent No.: US 6,181,666 B1
(45) Date of Patent: Jan. 30, 2001

(54) OPTICAL PICKUP

(75) Inventors: Yasuhiro Miyazaki, Hachioji; Naoaki Tani, Akiruno; Koichi Tamura; Keiji Mukawa, both of Hachioji; Etsuyasu Kondo, Hino, all of (JP)

(73) Assignee: Olympus Optical Company, Ltd., Tokyo (JP)

( * ) Notice: Under 35 U.S.C. 154(b), the term of this patent shall be extended for 0 days.

(21) Appl. No.: 08/954,743

(22) Filed: Oct. 20, 1997

(30) Foreign Application Priority Data

| Oct. 21, 1996 | (JP) | 8-278133 |
| Oct. 24, 1996 | (JP) | 8-282257 |
| Nov. 8, 1996 | (JP) | 8-296131 |
| Dec. 27, 1996 | (JP) | 8-350006 |

(51) Int. Cl.[7] .................................................. G11B 7/00
(52) U.S. Cl. ..................... 369/112; 369/110; 369/44.37; 369/44.23
(58) Field of Search ............... 369/44.23, 44.12, 369/44.11, 44.37, 44.28, 110, 112, 111, 109, 108

(56) References Cited

U.S. PATENT DOCUMENTS

| 5,132,953 | * | 7/1992 | Matsubayashi | 369/44.37 |
| 5,195,070 | * | 3/1993 | Shiba et al. | 369/44.12 |
| 5,493,554 | * | 2/1996 | Sasaki et al. | 369/110 |
| 5,761,178 | * | 6/1998 | Fukakusa et al. | 269/44.12 X |
| 5,790,502 | * | 8/1998 | Horinouchi et al. | 369/112 |

* cited by examiner

Primary Examiner—Muhammad Edun
(74) Attorney, Agent, or Firm—Stevens, Davis, Miller & Mosher, L.L.P.

(57) ABSTRACT

An optical pickup comprises a plurality of light sources for generating recording and reproducing light of information, a plurality of optical elements for treating light beam generated from the light sources, light detecting means for detecting light beam in a optical path to adjust various characteristics of the light beam, and a recording medium, wherein resolution or resolving power in recording time and in reproducing time is adjusted to match to each other.

5 Claims, 21 Drawing Sheets

FIG_1
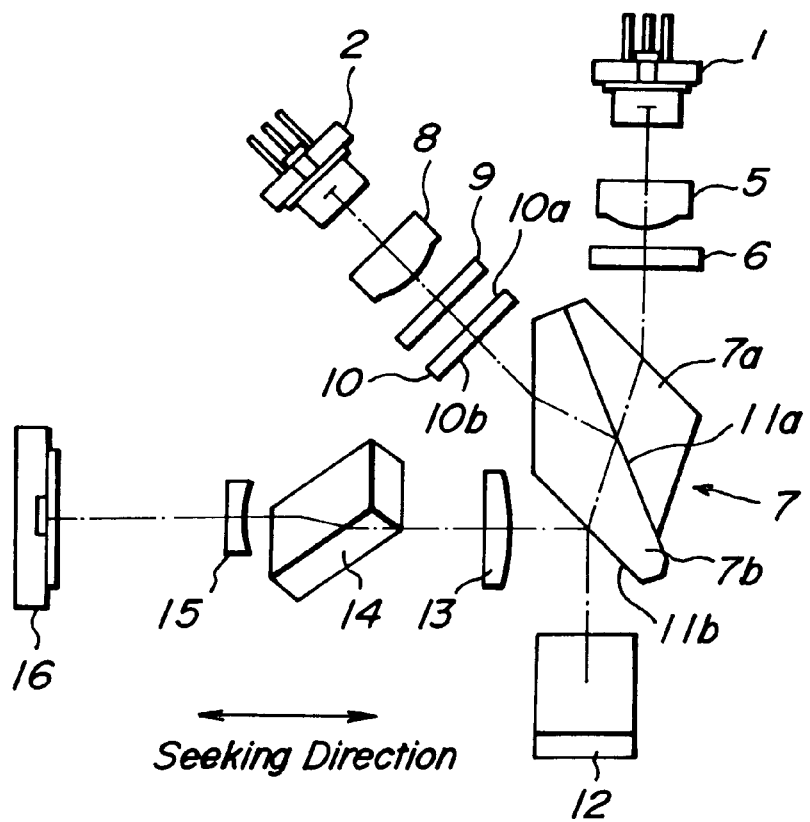
Seeking Direction
FIG_2
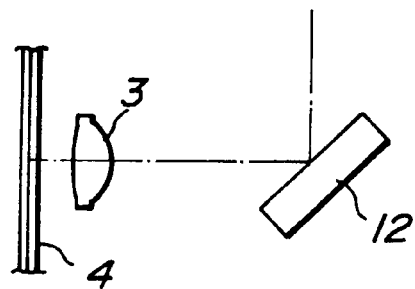

FIG_3
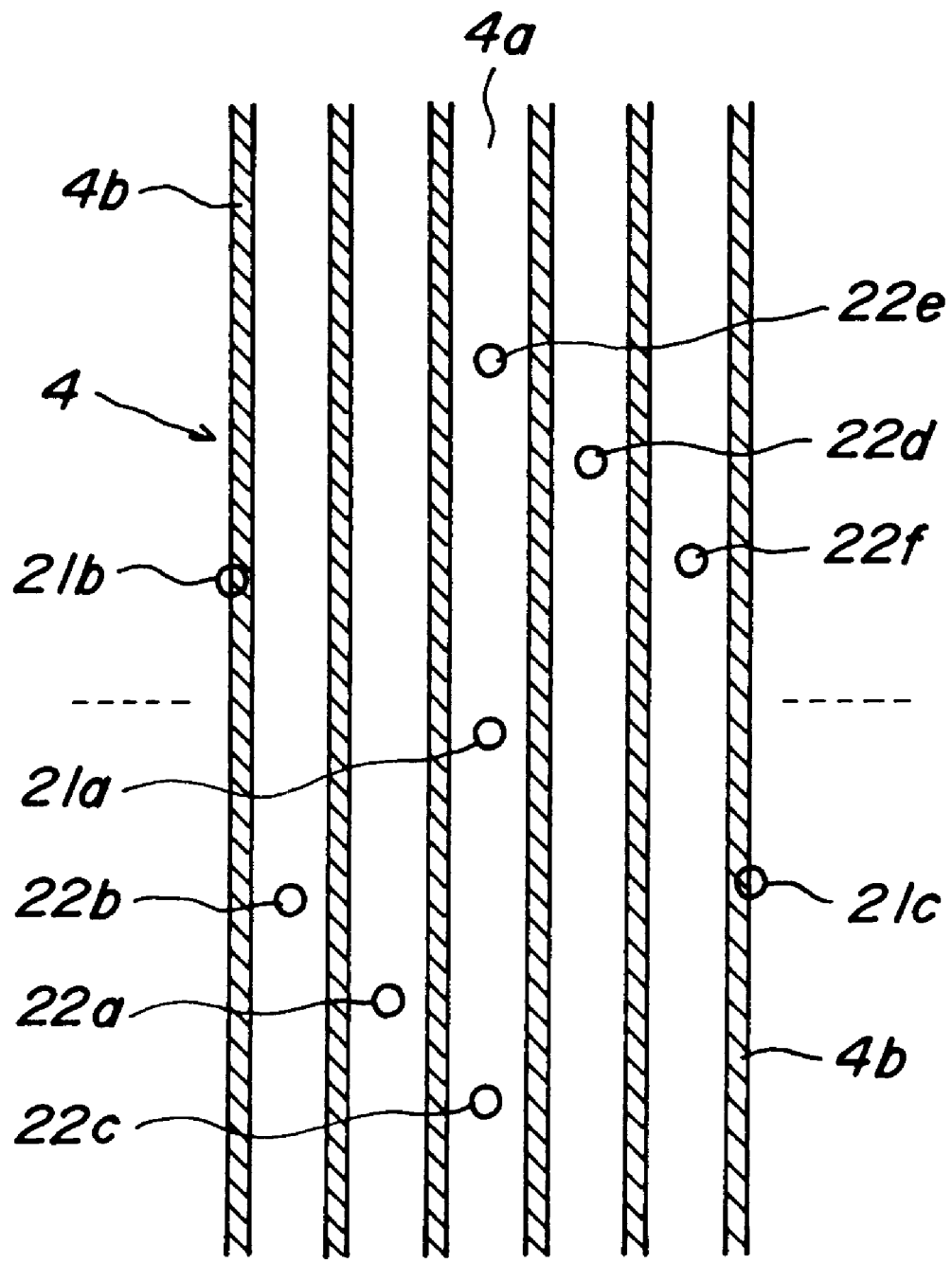

FIG_5
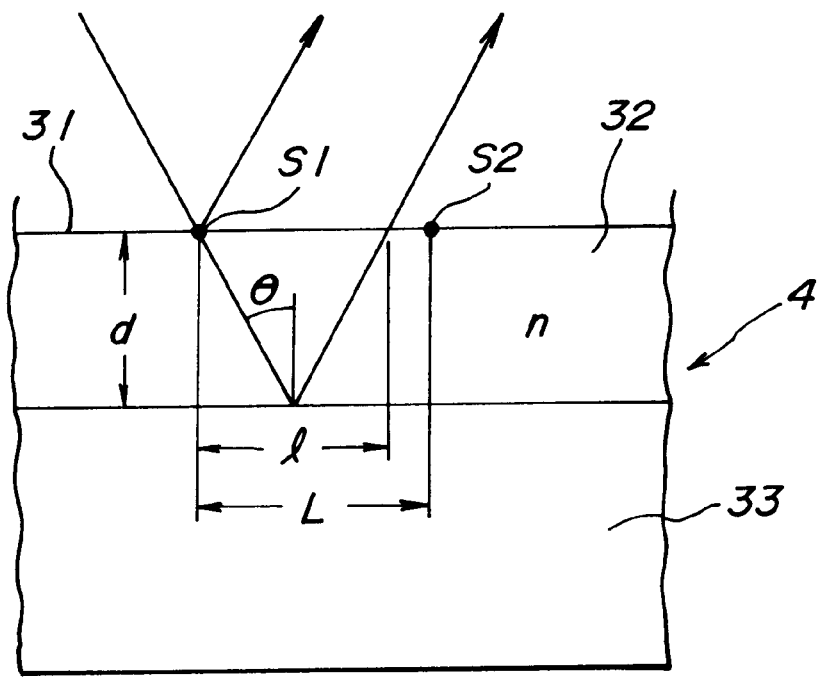
FIG_6
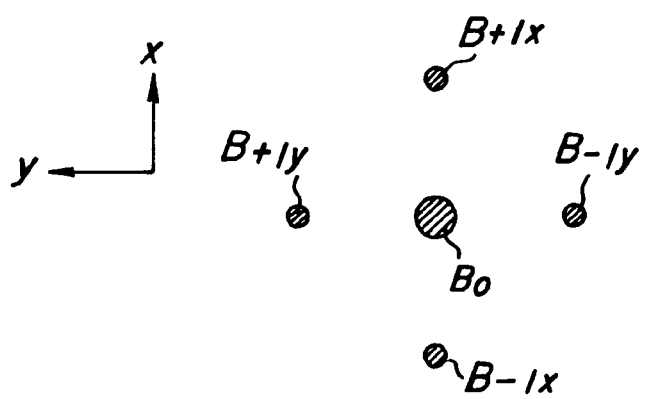

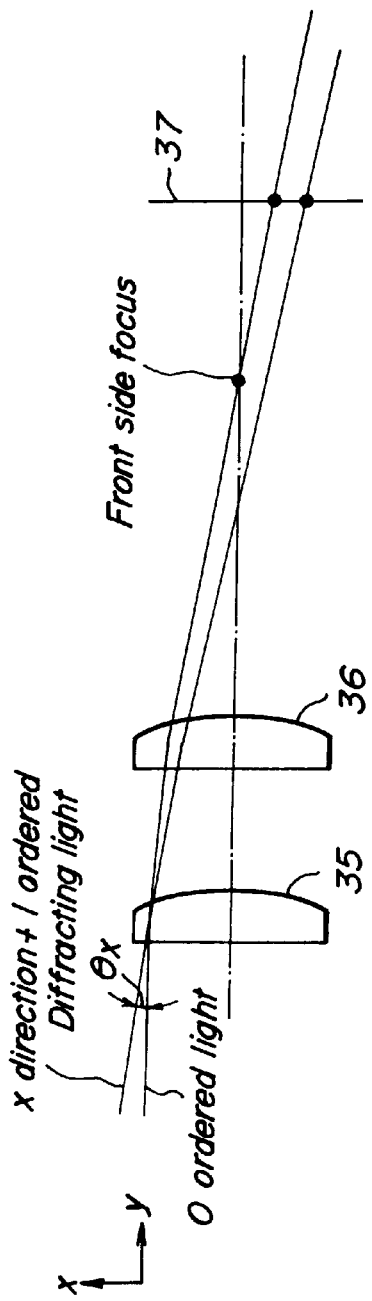
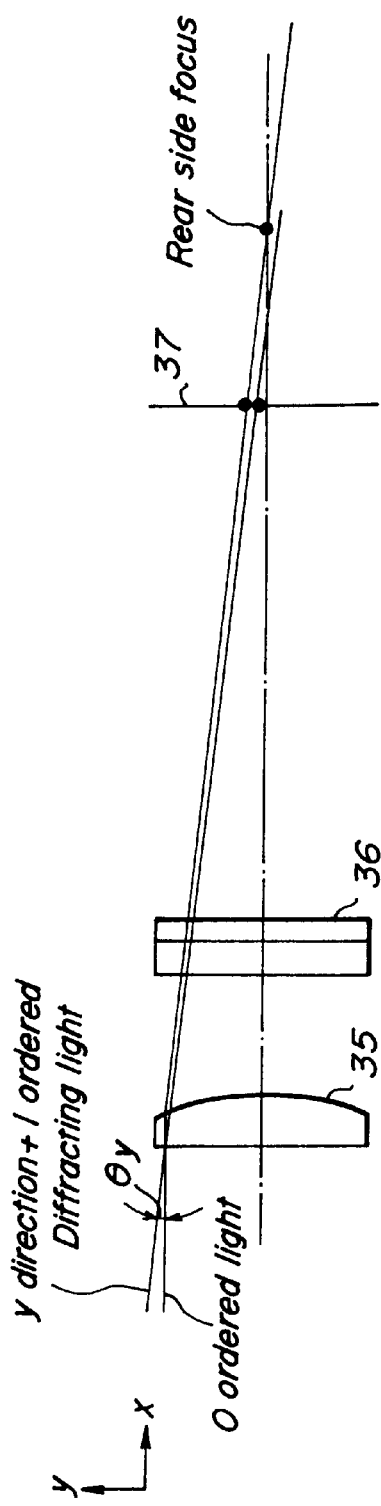

FIG_8
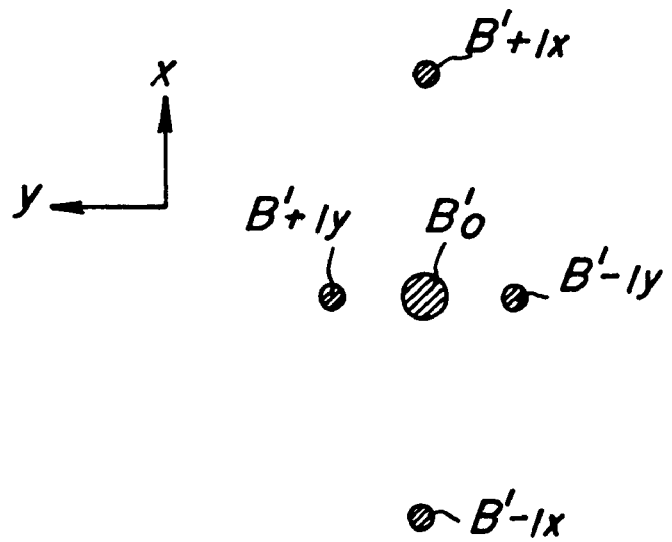
FIG_9
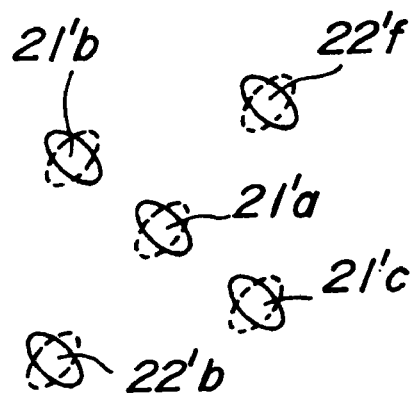

FIG_10
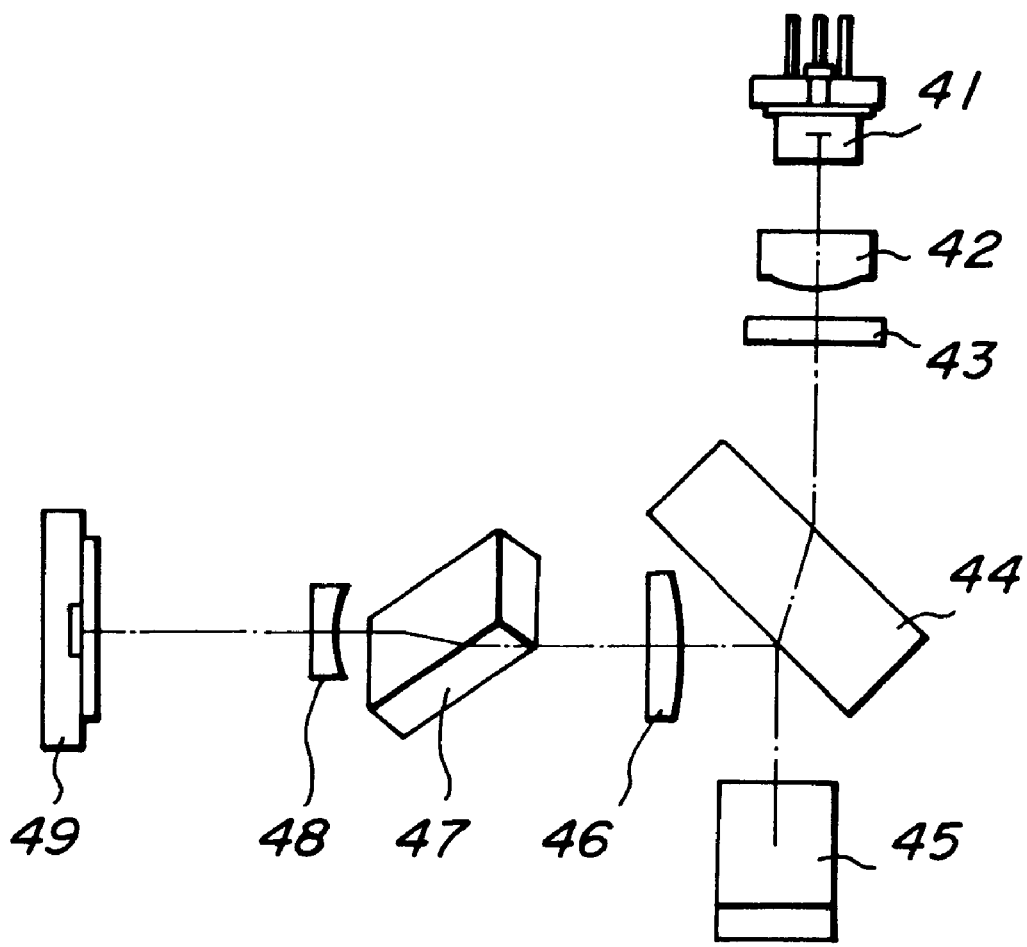

FIG_11
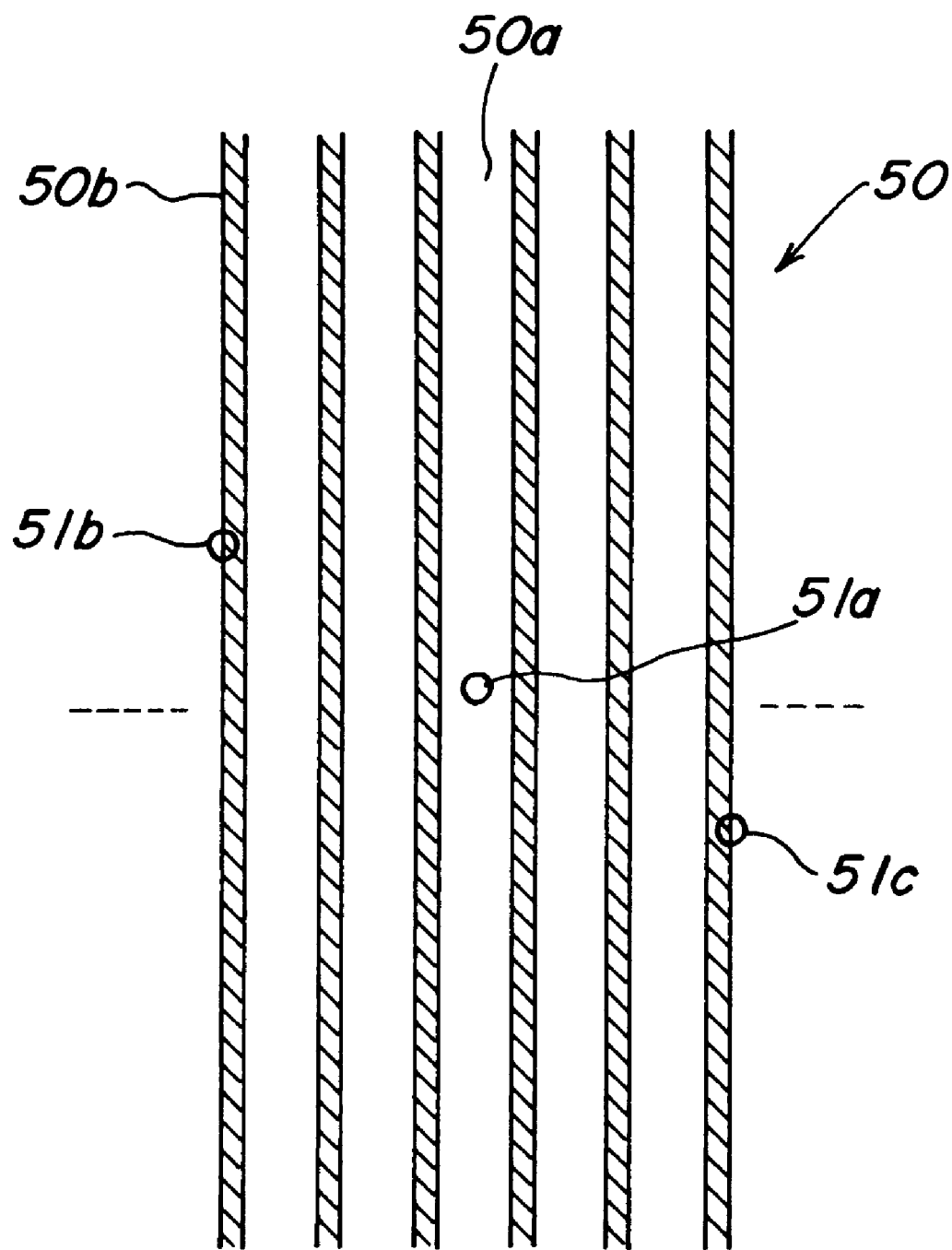

FIG_12
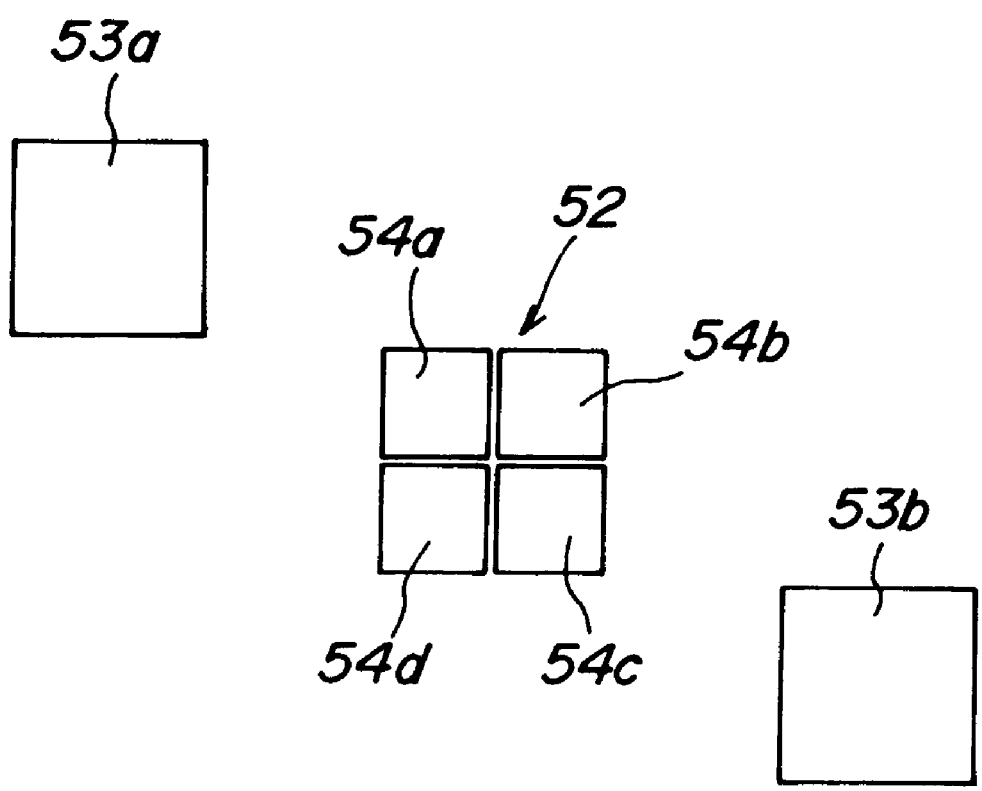

FIG_13a
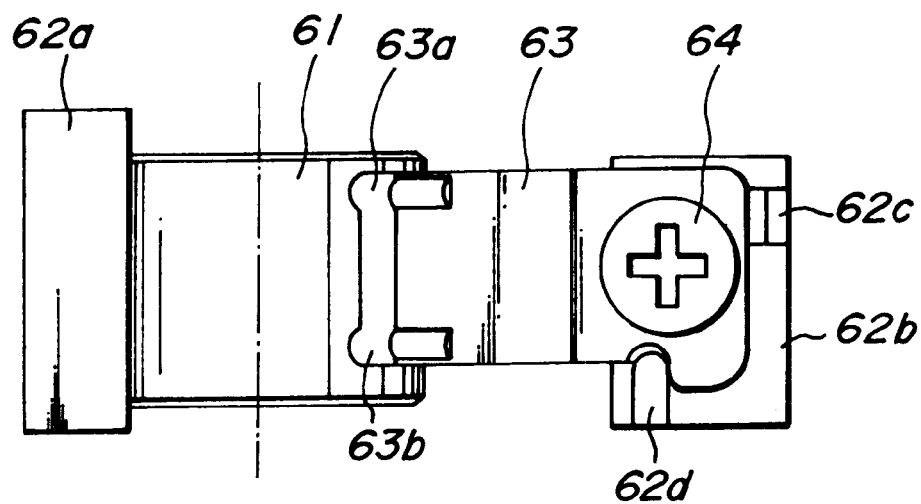
Seeking Direction
FIG_13b
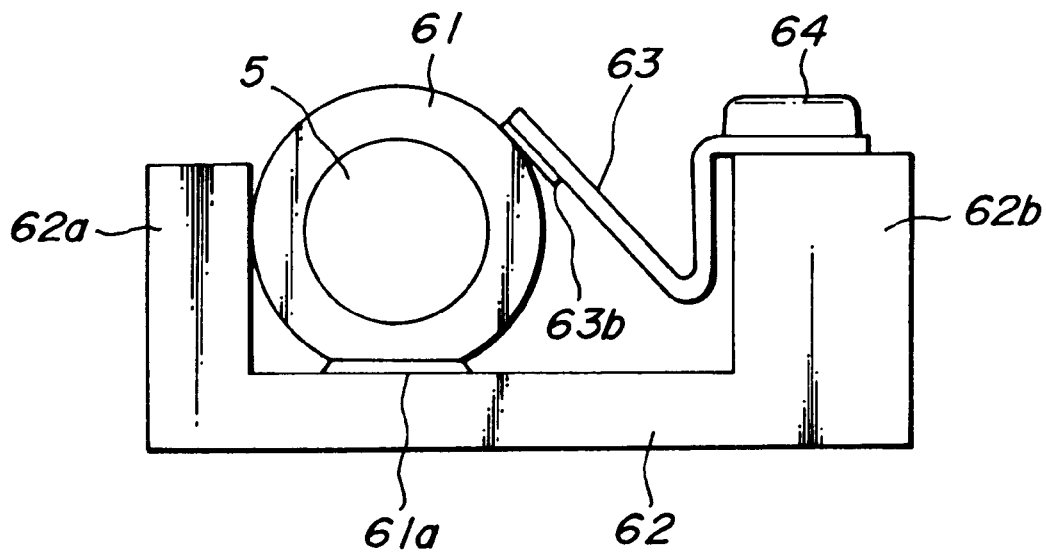

FIG_14
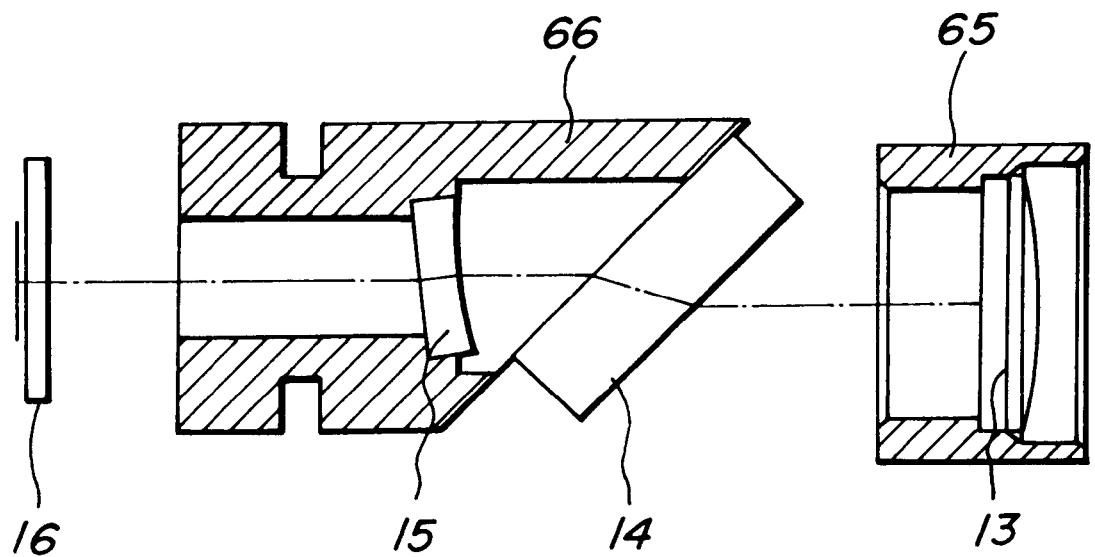

Seeking Direction

FIG_16

FIG_17

FIG._20
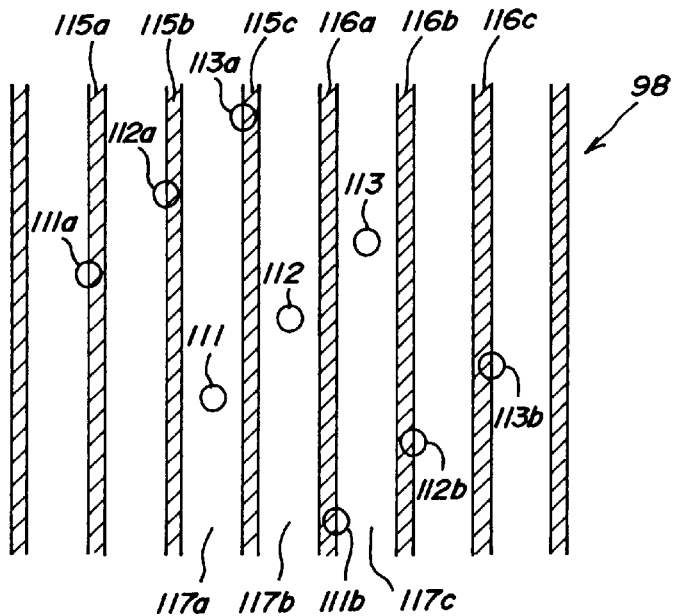
FIG._21
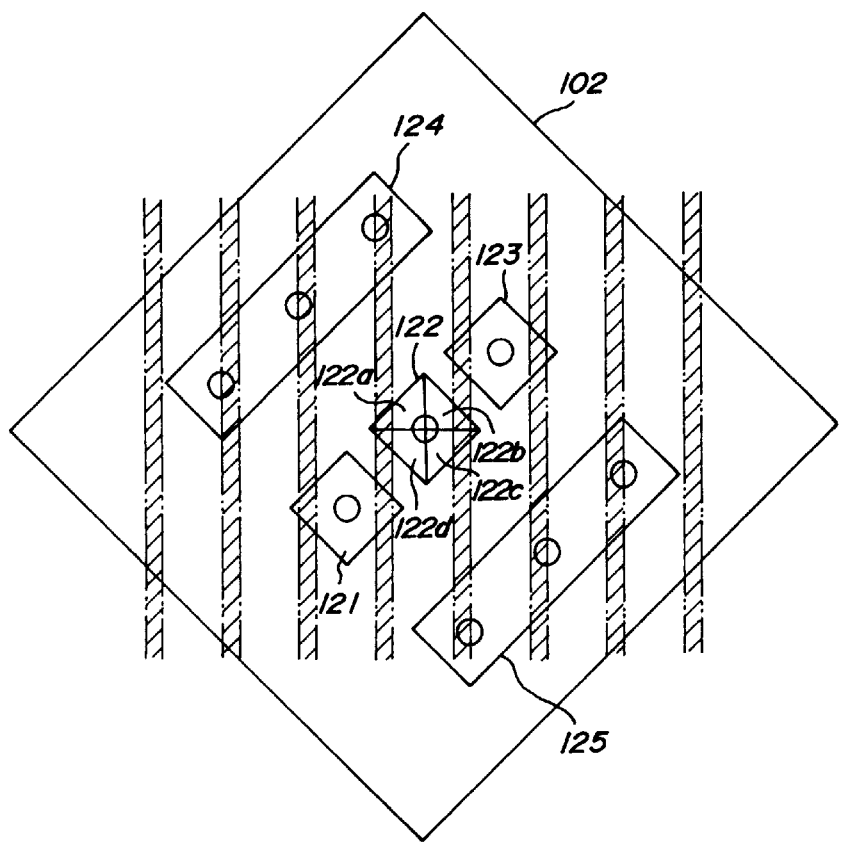

FIG_24
PRIOR ART

OPTICAL PICKUP

BACKGROUND OF THE INVENTION

1. Field of the Invention

The present invention relates to an optical pickup for recording and reproducing information on and from a recording medium such as an optical card and an optical disc.

The present invention also relates to an optical pickup for reproducing information recorded on the recording medium, such as the optical card and the optical disc or the like, especially to a multi-track read type optical pick up for reproducing plural tracks, simultaneously.

2. Related Art Statement

As a conventional optical pickup, there is an optical pickup in which in order to perform tracking control by, for example, 3 beam method, or to reproduce plural tracks simultaneously, a light beam from a semiconductor laser is collimated by a collimator lens to form a parallel luminous flux, this flux is divided into a plurality of light beams by means of a diffraction grating, these light beams are irradiated with a predetermined positional relation through an inward and return way separating optical element and an objective lens, and these return light are lead to a detecting optical system by separating the return light from the inward way through the objective lens.

In such an optical pickup, in order to increase utility efficiency of the light beam from the semiconductor laser, it is advantageous to utilize a polarizing beam splitter as an inward and return way separating optical element. To this end, for example, in the inward way, it is necessary to dispose the semiconductor laser in such a manner that a polarizing plane of emitting light thereof is made a predetermined direction for the polarizing beam splitter.

While, even though the semiconductor laser is disposed in such a way, for example, in the case of shaping a light beam of an ellipsoidal section emitted from the semiconductor laser into a circular section by a beam shaping prism, the semiconductor laser can not be disposed in such a way. As a countermeasure in this case, it is conceived that the semiconductor laser is disposed so as to shape the emitted light in the beam shape having circular section by the beam shaping prism and the polarizing direction thereof can be rotated by 90° by disposing a ½ wave plate between the semiconductor laser and the polarizing beam splitter.

In this case, however, as shown in FIG. 24, provided that a ½ wave plate 152 is disposed behind a diffraction grating 151 with an azimuth of 45°, an incident light beam Bin of linear polarization (inner direction in paper) from the semiconductor laser is incident on the ½ wave plate 152 by separating the light beam into, for example 0 ordered light B0 and ±1 ordered diffraction lights B+1, B−1 by the diffraction grating 151. Even though the 0 ordered light B0 is converted into a linear polarization having 90° rotated polarization plane, the ±1 ordered diffraction lights B+1, B−1 are not linearly polarized under the influence of incident angle dependency of the ½ wave plate 152 and are converted into right-handed and left-handed ellipsoidal polarization. Therefore, in the latter polarization beam splitter (not shown), there is a problem that an optical property for the ii ordered diffraction lights B+1, B−1 is decreased and thus primary problem can not be attained. Such a problem becomes remarkable in case of obtaining more high ordered diffraction light, in the diffraction grating 151.

In the case that the recording semiconductor laser and the reproducing semiconductor laser are used, light beams from these semiconductor lasers are irradiated on the polarization beam splitter, light beam from one semiconductor laser is transmitted or reflected through or on the polarization beam splitter, and the light beam from the other semiconductor laser is reflected or transmitted to c ose them in the same optical path, and these light beams are irradiated on the recording medium through common objective lens, the above problem arises in the same manner even in case of separating light beam from at least one of semiconductor lasers into plural sub-beams and of irradiating them on the polarization beam splitter.

When the recording semiconductor laser and the reproducing semiconductor laser are used, the light beams from these semiconductor lasers are composed substantially in the same optical path by the polarization beam splitter, and are irradiated on the recording medium through the common objective lens, the disposition of both semiconductor lasers can be considered so as to make polarizing planes of respective emitted lights orthogonal.

In case of disposing both semiconductor lasers in such a way, when light beams of ellipsoidal sectional shape emitted from respective semiconductor lasers are not subjected to a beam shaping to obtain light beam of circular sectional shape, the direction of respective ellipsoidal spots formed on the recording medium have major axis direction orthogonal to the tracks in recording time, and have major axis direction parallel to the tracks in reproducing time, and thus become orthogonal to each other, so that the strength distribution of respective spots on the recording medium are not all the same. Therefore, resolution and resolving power are not all the same at recording time and reproducing time and thus recording and reproducing with high precision can not be performed.

As a conventional optical pickup, there is provided an optical pickup in which in order to follow, for example, a recording beam or a reproducing beam to a predetermined track of a recording medium precisely, to record information while verifying, and to reproduce the information recorded on plural tracks of the recording medium, a plurality of light beams are irradiated on the recording medium in the form of spot shape and in a predetermined positional relation, the light reflected on the recording medium is received on corresponding light receiving element, thereby detecting required signals.

However, in the above conventional optical pickup, in some recording mediums, there is a problem that the return lights of the light beam irradiated at an adjacent position of the recording medium surface are also incident on other light receiving elements, so that these return lights are subjected to interference phenomena with each other, thereby causing large amounts of cross-talk, and thus the required signals can not be detected with the requisite precision.

For example, as in an optical card 161 shown in FIG. 25, the recording medium formed by laminating an adhesive layer 163, a recording layer 164 and a transparent layer 165 on a substrate 162 of resin, successively, has 400 μm thickness of the adhesive layer 163, a few tenths to a few hundredths nm thickness of the recording layer 164 and 400 μm thickness of the transparent layer. When plural light beams are condensed on the recording layer 164 of such an optical card 161 through the transparent layer 165 in a predetermined positional relation so as not to with respective reflected lights, if the condensed points of adjacent light beams on the recording layer 164 are closed, a cross-talk for which the reflected light of one light beam reflected on a boundary plane between the adhesive layer 163 and the substrate 162 through the recording layer 164 is entered into the return light of adjacent other light beams, thereby affecting unfavorable influence on the detection of the required signal. Moreover, in the case shown in FIG. 25, adjacent light beams irradiated on the optical card 161 are reflected somewhat on the surface of the transparent layer 165, so that the return lights thereof are interfered with each other on the corresponding light receiving element. However, the surface of the transparent layer 165 is sufficiently separated from the recording layer 164, so that the return lights on the surface are sufficiently diffused, and thus there is substantially no problem.

As the conventional optical pickup, there are two types of pickups; one is an integrated unit type capable of moving whole unit in the seeking direction crossing tracks of a recording medium, and the other is a separation type capable of moving a part of the optical pickup. In either type of optical pickup, optical members which form the optical pickup must be disposed with precise positioning.

In the conventional optical pickup, it is proposed that the optical members are held elastically in such a manner that the members can be moved in a predetermined direction being the adjusting direction, for example, in an optical axis direction, cannot be moved in the other direction, for example, in the direction orthogonal to the optical axis so as to adjust the position of the members in the optical axis direction. In such a way, the position of the optical members can easily be adjusted in the predetermined direction without affecting the position in the other direction.

However, in the conventional optical pickup, the relation of the adjusting direction of the optical members and the seeking direction the read is not considered at all. Therefore, in case of holding the optical member including in the movable pickup portion (hereinafter, referred to as movable member) elastically as described above so as to make the positional adjusting direction of the optical member and the seeking direction being the moving direction of the movable member parallel, if the movable member is run away in the seeking direction in any cause, its acceleration or the padding of the movable member to the run away stopper shift in the positional adjusting direction, so that desired optical characteristic can not be obtained.

For example, in the means for reading the optical card, the relative moving speed of the optical card and the optical pickup is slower than that of the means for reproducing or playing back the disc-shaped record medium, such as the CD or the like. Therefore, the reading beam is irradiated to each or respective plural tracks through an objective lens to receive the reflecting beam by the separate light receiving element so as to reproduce or playback the plural tracks simultaneously with only one scanning. Furthermore, it is necessary to follow the optical pickup, which is not only the above multi-track read type, to the track reading the beam for reading in the focusing state exactly. Accordingly, for instance, two other tracking beams in addition to the reading beam are irradiated to the recording medium to control the tracking by detecting the tracking error signal through the three beams method based on those reflected lights and to control the focus by detecting the focus error signal in addition to the playing signal based on the reading beam which is reflected by the record medium.

FIG. 26 describes an example of the relative positional relation between the spot formed on the record medium by the plural light beams carrying out the above multi-truck read and the track. Regarding this optical pickup, three reading beams and two tracking beams are irradiated on the optical card 171 to read three tracks successively. Three reading beams are irradiated to locate each spot 172a, 172b, 172c on successive three tracks 173a, 173b, 173c of the optical card 171. Two tracking beams are irradiated to locate each spot 174a, 174b on one side edge and the other side edge of different guide luck 175a, 175b.

FIG. 27 describes the constitution of the light detector receiving the reflected light on the optical card 171 of each light beam, arranged on the optical pickup carrying out the multi-truck read through detecting the plural light beams shown in FIG. 26. This light detector 181 has light receiving element 182a, 182b, 182c receiving each reflected light of reading spots 172a, 172b, 172c independently and light receiving element 183a, 183b receiving each reflected light of tracking spot 174a, 174b independently. In this situation, for example, the light receiving element 182b is constituted of the light receiving range divided into four parts. Regarding said light pickup, based on the output of the light receiving element 182a, 182b, 182c, the reading signal of the corresponding truck 173a, 173b, 173c is obtained and the trucking error signal is obtained through the three beams method based on the output of the light receiving element 183a, 183b. Furthermore, based on the output of the four-divided light receiving range of the light receiving element 182b, for instance, the focus error signal is obtained by the astigmatism means. Moreover, the reading signal of the truck 173b is obtained through adding the output of each light receiving range of the light receiving element 182b.

Concerning the above multi-truck reading light pickup, although the plural light beams irradiating to the record medium can be obtained by using each independent light source, for instance the semiconductor laser, a large and expensive device will be needed so that generally using one semiconductor laser, said laser beam is diffracted with plural diffraction gratings so as to obtain requested plural light beams. For example, to obtain five light beams shown in FIG. 26, using the first diffraction grating, which diffracts the light beam from one semiconductor laser and second diffraction grating, which diffracts the light beam, passed said first diffraction grating, to a different direction from the first diffraction grating direction, three light beams, which are 0 ordered diffraction light and ±1 ordered diffraction lights, are obtained. Each 0 ordered diffraction light on the second diffraction grating of said three light beams is the beam for reading and a pair of ±1 ordered diffraction lights on the second diffraction grating is the tracking beam.

At this point, based on the output of each light receiving element of the light detector 181 shown in FIG. 27, to detect the reading signal, the focus error signal and the trucking error signal, generally the output electric current of the light receiving elements 182a, 182c, 183a, 183b are successively changed to the voltage. Regarding the light receiving element 182b, the output current of each light receiving range is converted into the voltage so as to treat or after treating with the voltage mode, current to voltage conversion is carried out. In this case, as regards the circuit constitution and the cost or the like, it is favorable to use the I/V conversion, which accumulates the plural I/V conversions, having a relatively narrow dynamic range and the operating circuit, and the operator.

Therefore, with regard to above multi-truck reading light pick up, in FIG. 26, the light amount ratio of 0 diffraction light to ±1 ordered diffracting lights at the first diffraction grating is set up so that the light quantity ratio of three reading beams for forming the reading spot 172a, 172b, 172c is 1:1:1. Furthermore, since the light receiving element 182b is divided into four parts to detect the focus error signal also, the light quantity ratio of −1 ordered diffraction light, 0 ordered diffraction light and +1 ordered diffraction light on the second diffraction grating is 1:4:1 so that the light quantity, which in incident upon one of the light receiving ranges, and the light amount of the tracking beam, which respectively incidents upon the light receiving element 183a, 183b for detecting the tracking error signal, is nearly equal.

On the other hand the, above focus control and tracking control is carried out not only on the read-type (reproducing only) light pick up but on the write type (recording-reproducing) as well. There is known that as a write-type light pick up, using light beam from the semiconductor laser through one piece of diffraction grating, three light beams of 0 ordered light and ±1 ordered diffraction lights is obtained, then said one 0 ordered light is irradiated upon the track of the record medium as a beam for writing, said reflected light is received by the light receiving element having four-divided light receiving range as well as shown in FIG. 27 so that the focus error signal is detected through the astigmatism method and ±1 ordered diffraction lights are irradiated to one side of the edge and the other side of the edge of different guide track as shown in FIG. 26 so as to receive each reflected light by light receiving element respectively as shown in FIG. 27 to detect the tracking error signal by 3 beams method.

Regarding said write-type light pick up, since the emerging power of the semiconductor on writing is over ten times as large as that of the read type one, the light amount ratio of −1 ordered diffraction light, 0 ordered diffraction light and +1 ordered diffraction light is set up, for example, 1:16:1 to certainly prevent the not-requested entry by the beam for tracking.

Incidentally, to produce above multi-track read type light pickup and the write type light pickup, it is desirable to use common constructing member and manufacturing member from the point of the cost or the like. Especially, with regard to the diffraction grating it is unfavorable to manufacture the exclusive mask pattern and the exclusive diffraction grating for the expensiveness.

However, when the diffraction grating used in above write type light pick up is used as the second diffraction grating for above multi-track read type light pick up, in FIG. 27, the light quantity which incidents to the light receiving element 183a, 183b for the tracking error signal detection becomes extremely small since the emerging power of the semiconductor laser for the read type light pickup is small. Therefore, when the I/V converter and the operator, which dynamic range is narrow, is used as written above, the tracking error signal can not be precisely detected. To solve this problem, using the I/V conversion and the operator, which dynamic ranges are broad, or using the exclusive I/V converter and the exclusive operator, which have high sensitivity against the light receiving element 183a, 183b may be considered. In both cases, the result is higher manufacturing costs. In the latter cases, there is a problem that the constitution of the circuit becomes complicated.

Conversely, it is possible to use the second diffraction grating, which is used in the multi-track read type optical pickup, as the write type optical pickup. Regarding above second diffraction grating, the light amount ratio of the 0 ordered light and the +1 ordered diffraction light is 1:4:1 so that the second diffraction grating can not be shared since if it is used in the write type, the record medium is damaged through the tracking beam.

SUMMARY OF THE INVENTION

It is an object of the present invention to eliminate the above described disadvantages of the conventional optical pickup.

It is another object of the present invention to provide an optical pickup capable of obtaining plural sub-light beams having a predetermined even polarizing condition from a single light beam by using wave plate and diffraction rating.

It is another object of the present invention to provide an optical pickup in which, for example, a recording beam and a reproducing beam can be composed in substantially the same optical path with a decreased loss of light, and a resolution and resolving power can be made equal at recording time and reproducing time, respectively, thereby performing recording and reproducing with high precision.

It is another object of the present invention to provide an optical pickup in which the return light of plural light beams irradiated on the recording medium can be received on corresponding light receiving elements without occurring undesirable cross-talk, thereby detecting respective required signals with favorable precision always.

It is an object of the present invention to provide an optical pickup capable of effectively preventing positional shift of the position adjustable optical member with simple construction, even though the movable mer is run away.

It is a further object of the present invention to provide a multi-track read type optical pickup which can be shared with the diffraction grating, used in the write type pickup, without adding the special change on the constitution of the circuit so as to reduce costs.

According to the present invention, there is provided an optical pickup comprising a plurality of light sources for generating a light beam for recording and reproducing an optical information, on and/or from an optical recording medium, a plurality of optical elements for treating the light beam generated from the light sources, and light detecting means for detecting the light beam in an optical path to adjust various characteristics of the light beam, wherein resolution or resolving power in recording time and in reproducing time is adjusted to match to each other.

According to the present invention, there is provided an optical pickup comprising: a semiconductor laser, a collimator lens for collimating a light beam from the semiconductor laser to form a collimated light flux, a wave plate for changing a polarizing condition of the beam passing through said collimator lens into a predetermined condition, and a diffraction grating for separating the light beam passing through the wave plate into a plurality of sub-beams, the plural sub-beams obtained from the diffraction grating being irradiated on a recording medium through an objective lens.

It is preferable to include a polarization beam splitter in an optical path between the diffraction grating and the objective lens in the point that for example, incident light and return light for the recording medium are separated with effectively, and other light beams are composed in substantially the same optical path with decreased light amount loss.

In a preferable embodiment of the optical pickup according to the present invention, an optical pickup comprising: two semiconductor lasers disposed so as to emit a linear polarized beam having ellipsoidal sectional shape with an oscillating plane within a coplanar, a ½ wave plate for rotating a polarizing plane of the light bean from one semiconductor laser substantially 90°, and a polarization beam splitter for transmitting or reflecting the light beam from one semiconductor laser passing through the ½ wave plate and for reflecting or transmitting the light beam from the other semiconductor laser passing through the ½ wave plate to compose these beams in substantially the same optical path, respective light beams composed by the beam splitter are irradiated on a recording medium through an objective lens, thereby matching the sectional shape of respective beams having ellipsoidal sectional shape.

In a preferable embodiment of the optical pickup according to the present invention, an optical pickup for irradiating a plurality of light beams on a recording medium through a convergence optical system in order to perform at least one of recording and reproducing of information for the recording medium of multi-layer configuration having a recording layer comprising: provided that minimum interval of adjacent spots formed on the recording layer by the plural light beams is L, the thickness and the refractive index of the layer adjacent to the recording layer are d and n, and effective numerical aperture of the convergence optical system is NA, following equation is satisfied;

$$L > \tan\{\sin^{-1}(NA/n)\} \times 2 \times d$$

According to the present invention, there is provided an optical pickup in which in order to perform at least one of recording and reproducing of information for the recording medium, a plurality of light beams are irradiated on a recording medium through a convergence optical system, respective return light beams reflected by the recording medium are received on the corresponding light detector through astigmatism optical system, focusing error signals indicating relative positional shift between the convergence optical system and the recording medium are detected by astigmatism method based on outputs of at least one of light detectors, characterized by comprising the direction of the most nearly adjacent beam spots being matched with the minor axis direction of ellipsoidal shape of the return light beam formed by the astigmatism optical system at near side thereof.

According to the present invention, there is provided an optical pickup comprising a light source, a first diffraction grating for obtaining a plurality of light beams having substantially equal light strength by diffracting a light beam emitted from the light source in first direction, a second diffraction grating for obtaining first sub-beam, second sub-beam and third sub-beam disposed both sides of the first sub-beam, respectively, and having light strength of $1/x$ ($x \geq 1$) for the first sub-beam, respectively, irradiating means for irradiating the light beam from the second diffraction grating on a recording medium in such a manner that respective first sub-beams are disposed on different information tracks of the recording medium and respective second and third sub-beams are disposed on different guide tracks of guide tracks adjacent to the information track of the recording medium, first light receiving means including m light receiving elements for obtaining read signals of information recorded on corresponding tracks by receiving predetermined plural m sub-beams, independently, (m is any natural number except of 1) of the respective first sub-beams reflected on the recording medium, and at least one of light receiving elements having light receiving region divided by n (n is any natural number except of 1) so as to detect a focusing error signal for the recording medium of the irradiating means, and second light receiving means having two light receiving elements for receiving respective predetermined plural p sub-beams, independently, (p is any natural number except of 1) of the respective second and third sub-beams reflected on the recording medium, and for detecting tracking error signals in accordance with the outputs of these light receiving elements, the amount of light incident on one of light receiving regions divided by n of the first light receiving means is made substantially equal to the amount of light coincident on one light receiving element of the second light receiving means.

Respective values of the number x, n, p are selected so as to satisfy $x/n \approx p$.

The first diffraction grating and the second diffraction grating are formed on one optical base member.

BRIEF DESCRIPTION OF THE DRAWINGS

FIG. 1 is a plan view showing first embodiment of an optical pickup according to the present invention;

FIG. 2 is a partial side view of FIG. 1;

FIG. 3 is an explanatory view showing a relative positional relation of beam spot and a track on an optical card shown in FIG. 1;

FIG. 5 is an explanatory view explaining a condition of adjacent spot interval on the optical card shown in FIG. 1;

FIG. 6 is an explanatory view showing an arrangement of a plurality of beam spots on a recording medium;

FIGS. 7a and 7b are explanatory views each showing a converging or condensing condition due to an astigmatism optical system in case of condensing a return light of beam spot with astigmatism shown in FIG. 6;

FIG. 8 is an explanatory view showing a state of forming least circle of confusion of respective return light due to astigmatism optical system shown in FIG. 7;

FIG. 9 is an explanatory view explaining beam shape of return light incident on the light detector shown in FIG. 1;

FIG. 10 is a side view showing second embodiment of the optical pickup according to the present invention;

FIG. 11 is an explanatory view showing relative positional relation of beam spot and track on the optical card shown in FIG. 10;

FIG. 12 is a plan view showing a construction of light receiving plane of the light detector shown in FIG. 10;

FIGS. 13a and 13b are a plan view and a side view each showing a holding means of a collimator lens shown in FIG. 1;

FIG. 14 is a cross-sectional view showing a construction of a holding member for holding a plane-parallel plate and a concave lens shown in FIG. 1;

FIG. 20 is an explanatory view showing the relative positional relation between the beam spot and the track on the optical card shown in FIG. 1;

FIG. 21 is a plan view showing the constitution of the light receiving plane of the light detector shown in FIG. 1;

DETAILED EXPLANATION OF THE PREFERRED EMBODIMENT

Figure 4:
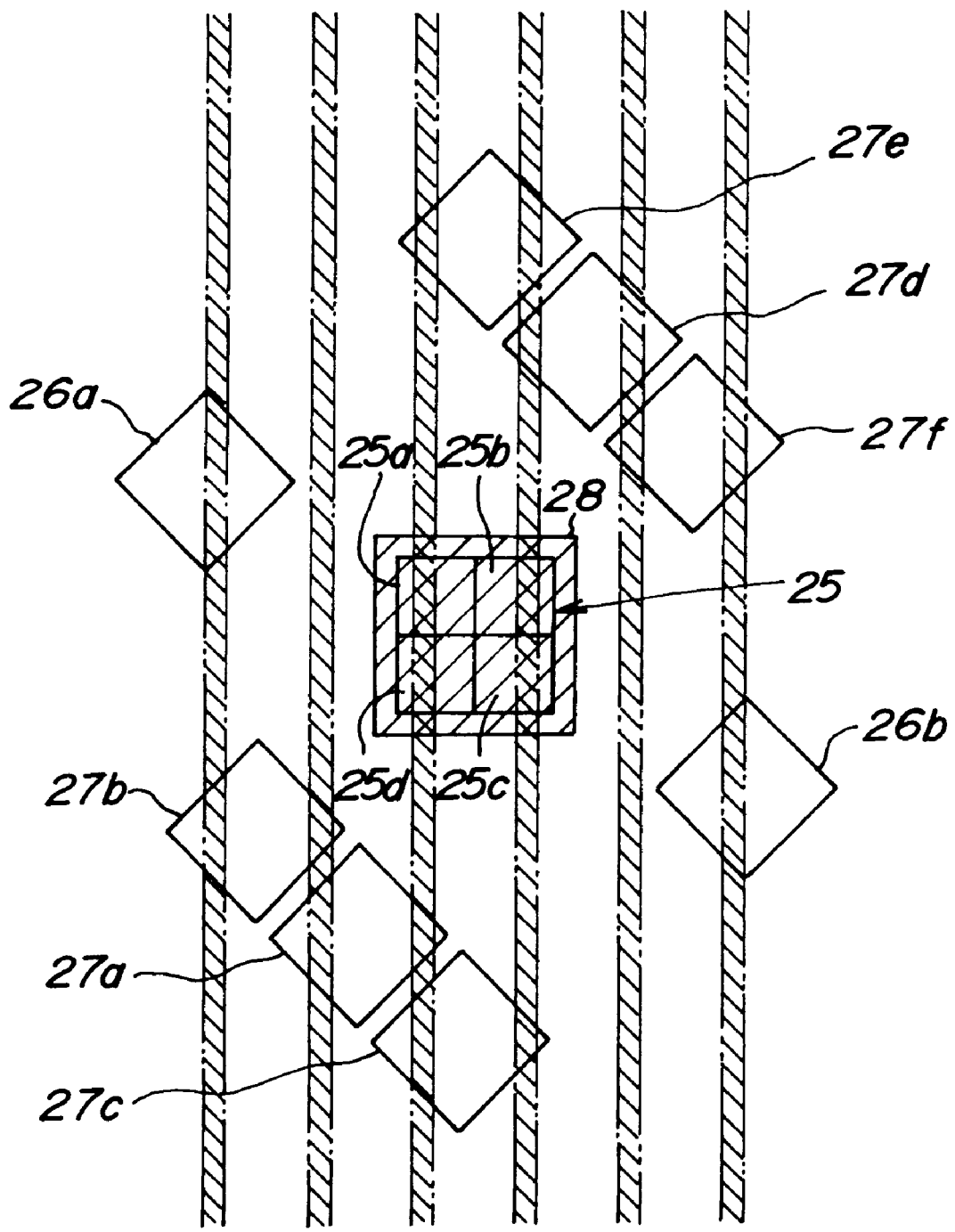
FIG. 4 is a plan view showing a construction of a light receiving plane of a light detector shown in FIG. 1.

Now to the drawings, there are shown various embodiments of according to the present invention. Like parts are shown by corresponding reference characters throughout several views of the drawings.

FIGS. 1 and 2 are a plan view and a partial side view showing a first embodiment of an optical pickup according to the present invention. This optical pickup comprises a recording semiconductor laser 1 and a reproducing semiconductor laser 2, the light beam from these semiconductor lasers 1 and 2 are irradiated on an optical card 4 through a common objective lens 3, and recording and reproducing of information are performed while performing tracking control and focusing control by the light beam from the semiconductor laser 1.

The semiconductor laser 1 is disposed to emit a linear polarization parallel to the paper plane in FIG. 1, its light beam having ellipsoidal sectional shape is made incident on a diffraction grating 6 as a collimated or parallel light flux formed by a collimator lens 5, and herein three beams of 0 ordered light (recording beam) and ±1 ordered diffraction lights (tracking beam) are obtained and thus these beams are made incident on a prism mer 7.

The semiconductor laser 2 is also disposed to emit a linear polarization parallel to the paper plane in FIG. 1, as in the same manner as the semiconductor laser 1, its light beam having ellipsoidal sectional shape is made as a collimated or parallel light flux formed by a collimator lens 8, and then incident on a diffraction optical member 10 after rotating polarization plane by 90° by a ½ wave plate 9 with 45° azimuth. The diffracting optical member 10 has different diffraction gratings 10a and 10b formed on both surfaces at incident side and emitting side of a glass base, two beams of ±1 ordered diffraction lights are obtained at the diffraction grating 10a at incident side, these two beams are made diffracted at diffraction grating 10b at emitting side, thereby obtaining three sub-beams of 0 ordered light and ±1 ordered diffraction lights, respectively, that is, six sub-beams in sum, these sub-beams are irradiated on the prism member 7.

In such a way, in this embodiment, the light beams from the semiconductor laser 2 are made as collimated or parallel light flux by the collimator lens 8, and are made incident on the diffraction grating 10 after rotating the polarizing plane by 90° by the ½ wave plate 9, so that the plural linear polarization having a polarizing plane equal to vertical direction of the paper from the diffraction grating can be obtained without occurrence of the problem of incident angle dependency at the ½ wave plate.

The diffraction grating 10a and 10b can be formed on single substrate, respectively, or the diffraction grating 10a can be formed on one surface of ½ wave plate 9. Moreover, the diffraction grating boa can be formed on an incident surface of the ½ wave plate 9, or the diffraction grating 10b can be formed on an emitting surface, of the wave plate 9, so that the number of components can be decreased, thereby decreasing the cost of the device.

The prism member 7 has a function of composing light beam from the semiconductor laser 1 and light beam from the semiconductor laser 2 and a function of separating the return light from the optical card 4 from its inward way, and thus comprises a first prism 7a having an incident plane of the light beam from the semiconductor laser 1, a second prism 7b having an incident plane of the light beam from the semiconductor laser 2, a first polarizing film 11a of beam composing provided on adjoining surface of first and second prisms 7a and 7b, and a second polarizing film 11b of inward and return way separation provided on the other surface of the second prism 7b. In this case, first polarizing film hla has for example P polarization transmittance Tp of 100% and S polarization reflectance Rs of 100%, and the second polarizing film lib has for example P polarization transmittance Sp of 70% and S polarization reflectance Rs of 60%.

The light beams from the semiconductor laser 1 through the diffraction grating 6 are made incident on the first polarizing film 11a through the first prism 7a with P polarization and so as to transmit them through the first polarizing film 11a with 100% transmittance. The light beams from the semiconductor laser 2 through the diffracting optical member 10 are also made incident on the first polarizing film 11a through the second prism 7b with S polarization and so as to reflect them on the first polarizing film 11a. Therefore, the light beam from the semiconductor laser 1 and the light beam from the semiconductor laser 2 are composed so as to travel in substantially the same optical path, thereby emitting these light beams from the second polarizing film 11b.

As described above, 6 light beams from the diffraction optical member 10 are incident on the first polarizing film lla as a linear polarization equal to vertical direction in paper on the polarizing plane, so that respective beams are reflected on the first polarizing film 11a with 100% without a loss of light occurring, and thus respective beams of 40% are transmitted the second polarizing film 11b.

As in this embodiment, in two light sources using two recording and reproducing semiconductor lasers and the common objective lens, when both recording beam and reproducing beam are controlled with the use of tracking error signals detected from the light beam of the either one of recording and reproducing semiconductor lasers, and if the light beam of either one of recording and reproducing semiconductor lasers is shaped in the tracking direction at the light flux section by the prism member, a serious problem arises in tracking control.

That is, when the shaping prism is subjected to a deformation by the change in surrounding temperature of the optical pickup, the optical axis of light beam to be shaped is shifted by a shaping ratio. In this case, the light beam which does not use as a detection of tracking error is subjected to a shift in positional relation between the spot on the recording medium and the track, irrespective of the duration of track controlling. The light beam used in detection of a tracking error signal follows precisely by a track, even in a change in surrounding temperature.

When either one of both recording and reproducing semiconductor laser is controlled by using tracking error signal detected from the light beam of either one of both recording and reproducing semiconductor lasers, even if the beam is shaped by the prism eer for either recording and reproducing beams, the light beam which is not used as a detection of the tracking error, which is subjected to a shift in positional relation between the spot on the recording medium and the track, irrespective of the duration of track controlling.

Then, in this embodiment, the light beam from the semiconductor laser 1 through the diffraction grating 6 and the light beam from the semiconductor laser 2 through the diffracting optical member 10 are not subjected to a beam shaping in the prism member 7, respectively. To this end, the prism member 7 is constructed in such a manner that when the inside light is extended so as to obtain a straight line, the plane in which the light beam is entered, is in parallel to the plane from which the light beam is emitted. That is, the prism 7 comprises a composing plane for composing the recording light beam entered from different directions and the reproducing light beam in the same optical path, in this embodiment, first polarizing film 11a, the incident angles of the recording light beam and the reproducing light beam are in a mirror relation for the composite plane as a reference plane, and the incident angle and the reflecting plane for the composite angle are fully equal to each other.

According to the above construction, in two light sources using two semiconductor lasers for recording and for reproducing respectively and the common objective lens, when both the recording beam and the reproducing beam are controlled with the use of tracking error signals detected from light beam of either one of recording and reproducing semiconductor lasers, the relative positional relationship among a spot due to light beam from the semiconductor laser 1 formed on the optical card 4, a spot of light beam from the semiconductor laser 2 and tracks can be prevented from being shifted by the wave fluctuations of respective light beam emitted from semiconductor lasers 1 and 2, particularly wave fluctuations of emitted light caused by changing power of the semiconductor laser 1 from reproducing power to recording power or the other way around, and the change of refractive ratio of the prism member 7 and the air due to the change of surrounding temperature.

That is, in this embodiment, in order to prevent the relative positional relationship among a spot due to the light beam from the semiconductor laser 1 formed on the optical card 4, and a spot of the light beam from the semiconductor laser 2 and tracks, from being shifted by the wave fluctuations of respective light beam emitted from semiconductor lasers 1 and 2, particularly wave fluctuations of emitted light caused by changing power of the semiconductor laser 1 from reproducing power to recording power or the other way around, and the change of refractive ratio of the prism member 7 and the air due to the change of surrounding temperature, the light beam from the semiconductor laser 1 through the diffraction grating and the light beam from the semiconductor laser 2 through the diffraction optical member 10 are not subjected to beam shaping by the prism m 7. To this end, when the prism member 7 is extended so as to make the inside light straight, the receiving surface of light beam and the emitting surface of light beam are made parallel.

The light beam emitted from the second polarizing film lib of the prism member 7 is reflected by a rising mirror 12 in the vertical direction to the paper of FIG. 1, and irradiated on the optical card 4 by the objective lens 3, as shown in FIG. 2.

The return light emitted by the optical card 4 is incident on the second polarizing film 11b of the prism member 7 through the objective lens 3 and the rising mirror 12, the return lights separated from the outward way are incident on a plane-parallel plate 14 disposed with 450 tilted for the optical axis (45° tilted to the tracking direction) through the condenser lens 13, so that the return lights are refracted and transmitted through the plane-parallel plate 14, and thus astigmatism for focusing error detection is generated and then the return light is incident on a light detector 16 through a concave lens 15. Moreover, respective member shown in FIG. 1 and FIG. 2 are fully secured to a casing (usually, referred to as a pickup body). This casing may be formed by a single member, or may be formed by two or more member.

As is seen from the above description and shown in FIG. 2, in this embodiment, the incident angle of the corresponding plane of the prism member 7 on which the light beam from the semiconductor laser 1, the light beam from the semiconductor laser 2 and the return beam from the optical card 4 are entered, does not make 0°, so that it can prevent stray lights from being generated on respective incident planes of the prism member 7.

FIG. 3 shows a relative positional relationship among a spot, due to the light beam from the semiconductor laser 1, formed on the optical card 4, a spot due to the light beam from the semiconductor laser 2 and the tracks. In FIG. 3, spots 21a–21c show spots due to light beam from the semiconductor laser 1, particularly, the spot 21a shows a spot due to 0 ordered light of diffraction grating 6, spots 21b, 21c show spots due to ±1 ordered diffraction lights of the diffraction grating 6.

Spots 22a–22f show spots due to light beam of the semiconductor laser 2. These spots 22a–22c, herein, show, for example, spots in which +1 ordered diffraction light of a diffraction grating 10a is separated into 0 ordered light and ±1 ordered diffraction lights by the diffraction grating 10b and the spot 22a shows spot due to 0 ordered light and spots 22b, 22c show spots of ±1 ordered diffraction lights, respectively. In the same way, spots 22d–22f show spots in which −1 ordered diffraction light of a diffraction grating 10a is separated into 0 ordered light and ±1 ordered diffraction lights by the diffraction grating 10b and the spot 22d shows spot due to 0 ordered light and spots 22e, 22f show spots of ±1 ordered diffraction lights, respectively.

That is, the spots 21a–21c due to light beam from the semiconductor laser 1 are positioned in such a manner that the spots 21b, 21c are respectively positioned on an edge at one side of and an edge at the other side of a guide track 4b apart from few tracks across the required track 4a diagonally, under the condition that the spot 21a is positioned on the required track 4a of the optical card 4 by the tracking control.

The spots 22a–22c due to light beam from the semiconductor laser 2 are positioned on successive three tracks at one side including the required the track 4a in which the spot 21a is positioned, and the spots 22d–22f due to light beam from the semiconductor laser 2 are positioned on successive three tracks at the other side including the required track 4a in which the spot 21a is positioned.

In such a way, in the recording mode of information, light beam changed from reproducing power to recording power is made emitted from the semiconductor laser 1 in accordance with information to be recorded, and light beam of the required reproducing power is made emitted from the semiconductor laser 2, thereby performing the tracking control in accordance with return light from the spots 21b, 21c, and the information is recorded on the required track 4a by the spot 21a and the recorded information is verified in accordance with the return light from the later spots 22e or 22c, while performing blank check and defect detection by, for example, preceding spots 22c or 22e in accordance with moving direction of the optical card 4.

In reproducing mode of information, the light beams of required reproducing power are made emitted from the semiconductors 1 and 2, respectively, and while performing tracking control in accordance with the return light from the spots 21b, 21c, multi-track reading, in which five tracks are reproduced simultaneously, is performed in accordance with return lights from spots 22a–22c and spots 22d–22f. In this case, spots 22c and 22e are positioned on the same track 4a, so that the track 4a is reproduced by either one of these spots 22c and 22e.

FIG. 4 is a plan view showing a construction of light receiving plane of a light detector 16. The light detector 16 comprises a light receiving section 25 for receiving the return light from the spot 21a shown in FIG. 3, light receiving sections 26a, 26b for receiving the return light from spots 21b, 21c, light receiving sections 27a–27c for receiving the return light from the spots 22a–22c, and light receiving sections 27d–27f for receiving the return light from the spots 22d–22f, these light receiving sections are formed on the same semiconductor substrate. Light receiving portion 25 is constructed by four-divided light receiving regions 25a–25d.

In such a way, a focusing error signal Fo is obtained for controlling the objective lens 3 by astigmatism method in accordance with outputs of 4-divided light receiving regions 25a–25d of a light receiving portion 25. That is, outputs of the light receiving regions 25a–25d are made $I_{25a}$–$I_{25d}$, the focusing error signal Fo is designated by following equation.

$$Fo = (I_{25a} + I_{25c}) - (I_{25b} + I_{25d})$$

A tracking error signal Tr is obtained for controlling tracking of the objective lens 3 by 3-beam method in accordance with outputs of light receiving regions 26a, 26b. mat is, outputs of the light receiving regions 26a, 26b are made $I_{26a}$–$I_{26b}$, the tracking error signal Tr is obtained by following equation.

$$Tr = I_{26a} - I_{26b}$$

Then, successive five tracks are reproduced simultaneously in accordance with outputs of light receiving regions 27a–27f. As illustrated in FIG. 3, also, spots 22c and 22e are positioned on the same track 4a, so that as described above, this track 4a is reproduced in accordance with the output of the light receiving region which receives either one of spots 22c and 22e in reproducing mode, and in recording mode, for example, blank check and defect detection of the track 4a are performed in accordance with outputs from the light receiving region which receives the return light from the preceding spot, and the track 4a is verified in accordance with the output of the light receiving region which receives the return light from the later spot.

Then, as described above, when a plurality of light spots are formed on the optical card 4, and the return light from these spots are received on a plurality of light receiving regions formed on the same semiconductor substrate, if there is large difference in power of return light incident on respective light receiving regions, the peak value of output becomes very large. Particularly, in this embodiment, in case of detecting focusing error by the return light from the recording spot 21a, the amount of light incident on the light receiving portion 25 becomes larger by tenth-odd times as compared with the amount of light incident on the other light receiving region, so that peak value of output of the 4-divided light receiving regions 25a–25d becomes larger than peak value of output of other light receiving region. Therefore, for example, in case of converting output currents of plural light receiving regions into respective voltages simultaneously by an I/V converter integrated with plural I/V converting circuits, since in common I/V converter, it can not be set to any dynamic range every respective I/V converting circuit, that is, the dynamic range of the whole I/V converting circuit is the same, a converter having very wide dynamic range is necessary as an I/V converter, which is not preferable cost-wise.

Then, in this embodiment, a light damping layer 28 is provided on the surface of the light receiving portion 25 of the light detector 16 as shown in FIG. 4 so as to make peak values of output of respective light receiving regions equal substantially. In such a way, an I/V converter having a narrow dynamic range can be used as an I/V converter, which is more preferable because of reduced costs. Moreover, instead of providing light damping layer on the light detector itself, a light damping member for decreasing light power in an optical path in which the return light having relative high strength is incident, for example, a color glass filter, a diffraction grating, a semitransparent plate on which dielectric film and metal film are deposited, or the like, may be provided.

As described above, according to this embodiment, the light beams from the semiconductor laser 2 are collimated by the collimator lens 8, and are incident on a diffracting optical member 10 after rotating its polarization plane with 90° by the ½ wave plate 9, so that a plurality of linear polarization lights with equal polarization plane from the diffraction optical member 10 can be obtained, without occurring an problem of incident angle dependency at the ½ wave plate 9 does not occurred.

Moreover, the semiconductor lasers 1 and 2 are disposed so as to emit linear polarization parallel to a paper in FIG. 1, the light beam from the semiconductor laser 1 is made incident on the first polarizing film 11a of the prism member 7 with P polarization, the light beam from the semiconductor laser 2 is made incident on the first polarizing film 11a with S polarization after rotating its polarization plane with 90° by the ½ wave plate 9, and thus these light beams are made composite into the same optical path, so that both light beams can be composed into substantially the same optical path without occurring light amount loss, and the shape of the spot having ellipsoidal sectional shape of both light beams on the optical card can be matched in such a manner that the minor axis direction of the ellipsoidal spot is in parallel to the track, and thus resolution or resolving power can be matched in recording mode and in reproducing mode, respectively, thereby attaining recording and reproducing with high precision.

Moreover, the present invention is not limited to only the above described embodiments, but various changes and modifies can be possible. For example, in the above embodiments, the focusing control and the tracking control are performed by using the light beam from the recording semiconductor laser 1, but in FIG. 1, a diffraction grating 6 for 3-beam type can be disposed in an optical path between the ½ wave plate 9 and the diffracting optical member 10, so that the tracking control is performed by using the light beam from the reproducing semiconductor laser 2 and the focusing control can be performed by using the light beam from the recording semiconductor laser 1. In the construction shown in FIG. 1, even if the ½ wave plate 9 is disposed between the collimator lens 5 and the diffraction grating 6, and the semiconductor lasers 1 and 2 are disposed in such a manner that the polarization plane of emitted lights therefrom becomes vertical direction to paper shown in FIG. 1, the diffraction grating 6 and the diffracting optical member 10 can be so constructed that the light beams therefrom are composed into substantially the same optical path in the prism member 7.

As described above, moreover, the construction capable of obtaining plural light beams having matched polarizing conditions from single light beam is not limited to the above embodiments, but also can be applied effectively to the case that plural light beams including beam for tracking control or plural light beams for multi-track reading are obtained, when constructing an optical pickup for one track read-write by using two semiconductor lasers, or the multi-track read-only or one track read-only by using one semiconductor laser.

Moreover, the construction for composing two beams emitted by using two semiconductor lasers into substantially same optical path with the polarizing film after rotating the polarizing plane of either one light beam of the two beams by 90° by a ½ wave plate, can be applied effectively even to the case of performing one track read-write. In this case, for example, in the construction shown in FIG. 1, the diffraction grating 10b is omitted and two reproducing beams are obtained by the diffraction grating 10a from light beam of semiconductor laser 2, these two reproducing beams are irradiated on the optical card 4 as shown in FIG. 3 so as to form the spots 22c, 22e on the same track 4a of the optical card 4. Moreover, light beam from the semiconductor laser 1 are separated into 3 beams as in the same manner as FIG. 1 by the diffraction grating 6, the 0 ordered light is irradiated on the same track 4a on which spots 22c and 22e are disposed, so as to form the spot 21a, and ±1 ordered diffraction lights are irradiated in such a manner that respective spots 21b, 21c are formed on an edge at one side and an edge at the other side of a guide track separated from few tracks across the track 4a diagonally.

In such a way, in recording of information, as described above, while performing a blank check and a defect detection by a preceding spot of spots 22c, 22e disposed on the same track 4a, and performing a verify by a following spot, the information is recorded by the spot 21a, at the same time, the focusing error signal is detected by the return light of the spot 21a, and the tracking error signal is detected by the return light of the spots 21b, 21c. Moreover, in reproducing of information, only the semiconductor laser 1 is driven by the reproducing power, the reproduced signal and the focusing error signal are detected by the return light of the spot 21a and the tracking error signal is detected by the return light of the spot 21b, 21c.

In such a way, the recording and the reproducing can be performed by using the same semiconductor laser 1, so that the shape of spot having ellipsoidal sectional shape formed on the optical card 4a can be made coincident with each other precisely in recording time and in reproducing time. Therefore, resolution or resolving power can be made coincident precisely in recording time and in reproducing time, respectively, thereby attaining recording and reproducing with high precision.

In the above embodiment, an astigmatism is generated for detecting the focusing error signal with the use of the condenser lens 13 and the plane-parallel plate 14, but the astigmatism can also be generated by using other lens such as cylindrical lens and torlic lens or the like, instead of the condenser lens 13 and the plane-parallel plate 14. Moreover, the present invention is not limited to the optical card, but can be applied effectively to a pickup for performing recording and reproducing of information for other recording medium such as optical disc or the like.

While as shown in FIG. 3, when a plurality of light beams (9 beams in FIG. 3) are irradiated on the optical card 4, its plural return beams are received on corresponding light receiving elements, other lights of other light beam are entered into the light receiving elements on which the return light of a predetermined light beam is received, thereby generating a cross-talk, and affecting unfavorably influence on the detection of required signal. For example, as described in FIG. 25, if the optical card 4 is constructed by laminating the adhesive layer, the recording layer and the transparent layer on the substrate, the light beam converged on the recording layer is transmitted through the recording layer and reflected on a boundary plane between the adhesive layer and the substrate, thereby causing a cross-talk for which the return light on the boundary is entered into the return light of adjacent other light beam.

Figure 25:
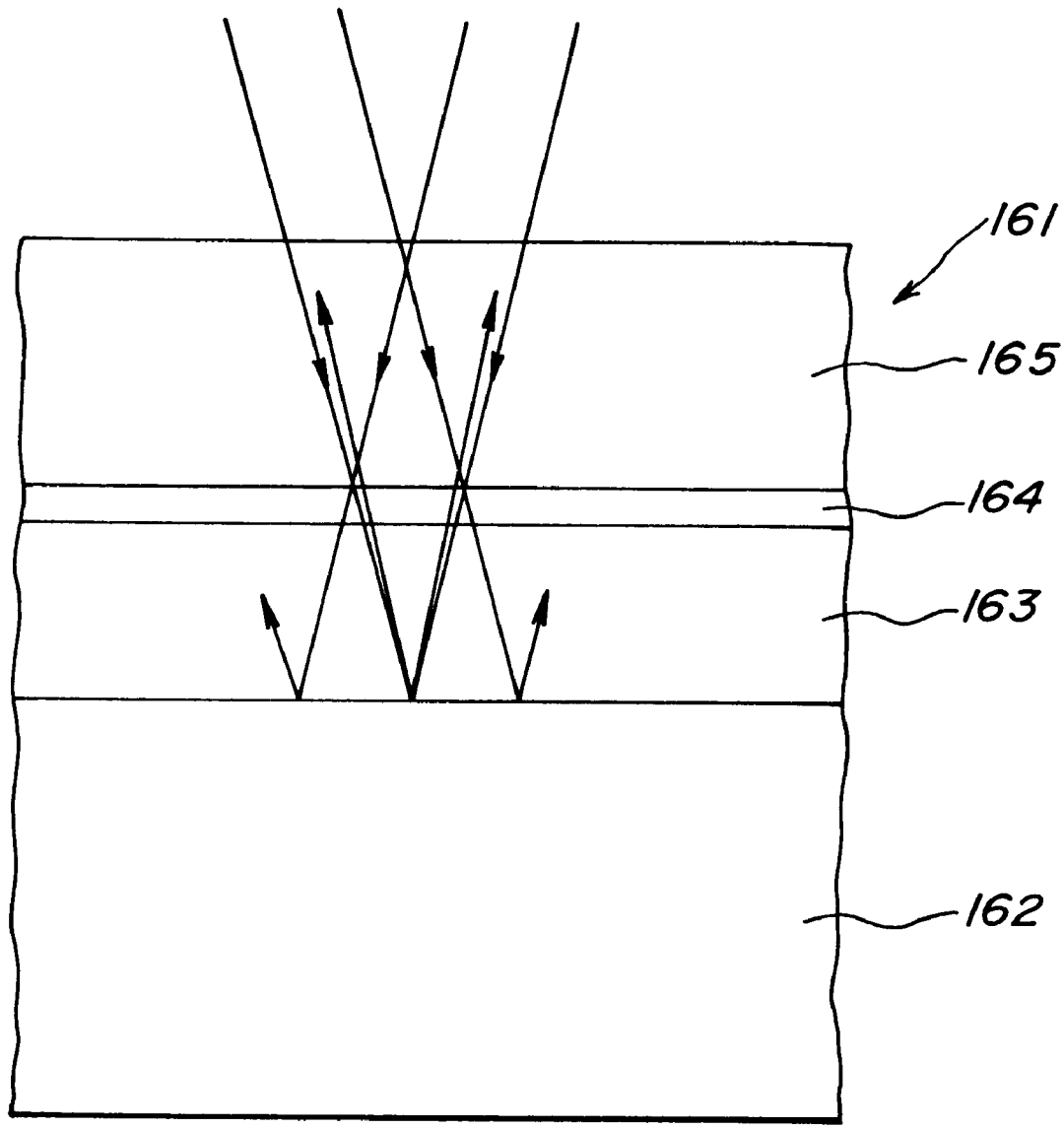
FIG. 25 is an explanatory view showing the problem of conventional optical pickup.
Figure 26:
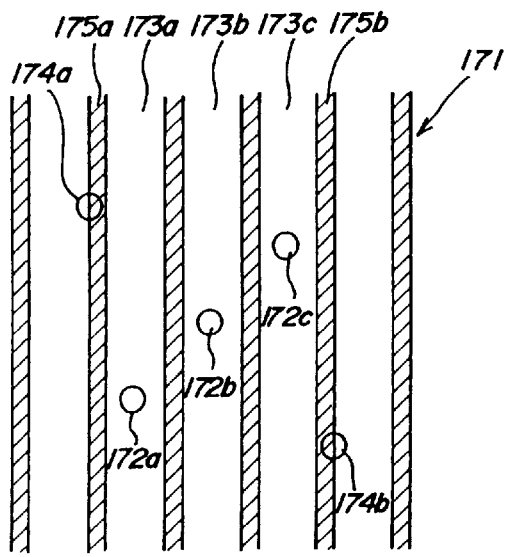
FIG. 26 is an explanatory view showing the relative positional relation between the beam spot and the track on the optical pick up for conventional multi-track read type.
Figure 27:
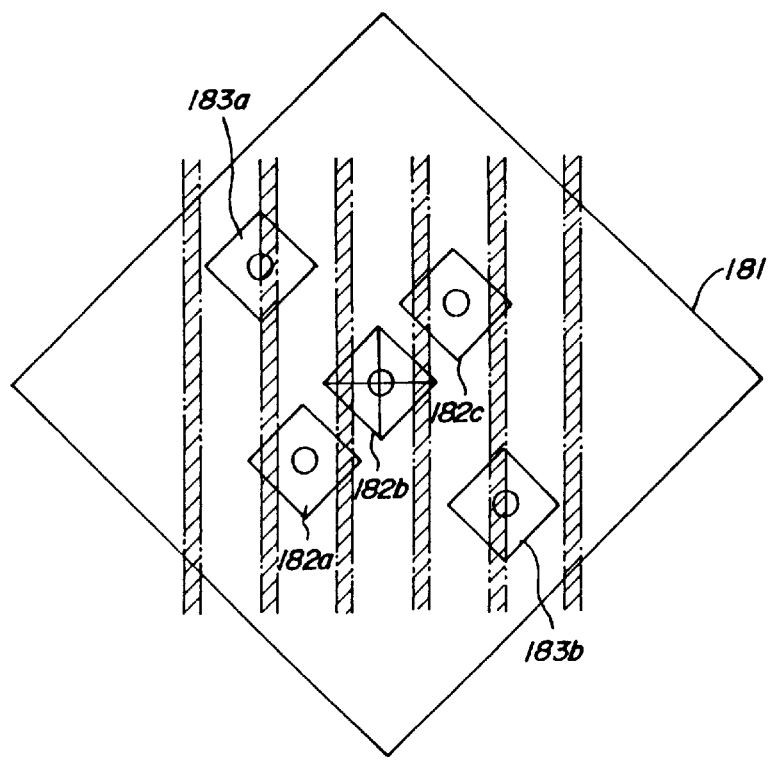
FIG. 27 is a plan view showing the constitution of a light receiving plane of the light detector in the conventional optical pickup shown in FIG. 26.

In this embodiment, in the case that the optical card 4 is constructed as in the same manner as one shown in FIG. 25, as shown in FIG. 5, the light reflected on the adhesive layer 32 and the substrate 33, of the light beam forming the spot Si on the recording layer 31 is prevented from being entered in the spot S2 formed by the other light beam, formed on the recording layer 31 most adjacent to the spot Si. That is, provided that the interval between the spots S1 and S2 on the recording layer 31 is L, and the interval from the position forming the spot S1 by the light beam to the position in which the light beam is reflected on the boundary plane between the adhesive layer 32 and the substrate 33 and again received on the recording layer 31, is l, the following equation is satisfied: L>l. In this case, l is given as follows: l=tan θ×2×d Also, θ is given by the following equation: θ=sin$^{-1}$ (NA/n) wherein θ is an effective aperture numeral of light flux received on the optical card 4 through the objective lens 3, so that the following equation is obtained.

$$L > \tan\{\sin^{-1}(NA/n)\} \times 2 \times d$$

In such a construction, since for example, the spot 21a for use in recording has most high power and most large effect on the element receiving reflected light, caused by the surface of the medium, of peripheral spots. Therefore, if the effect from the spot 21a is taken as an example, in FIG. 5, undesired return light of the light beam forming the spot 21a does not illuminate on the light receiving elements 26a, 26b, 27a–27f receiving the return light of light beams forming spots 21b, 21c, 22a–22f. Therefore, respective required signals can be detected with favorable precision without modulating the outputs of respective light receiving elements unfavorably.

In order to satisfy the above conditions, it is preferable that for example, as the diffraction grating 6 and the diffracting optical member 10, a diffraction element having large diffraction angle is used and as the objective lens 3, a lens having large focal length is used, if the diffraction angle is made too large, aberration of the objective lens 3 becomes large, and thus shading of light flux by the objective lens is caused. Also, if the focal length is made large while securing NA of the objective lens 3, whole optical system including the objective lens 3 becomes large, and thus whole apparatus becomes large, so that it is preferable to make interval L of adjacent spots minimum in order to satisfy the above conditions.

In this embodiment, in the focusing control range of the objective lens 3, in order to eliminate unfavorable effect of the above cross-talk, the direction of most nearly adjacent spots on the optical card 4 and the minor axis direction of ellipsoidal shape of the return light of the light beam caused by the astigmatism optical system including the condenser lens 13 and the plane-parallel plate 14 are matched substantially, at near side thereof.

As shown in FIG. 6 for example, supposing that the spot B0 of 0 ordered light , spots $B_{+1x}$, $B_{-1x}$ of ±1 ordered diffracting light in x direction and spots $B_{+1y}$, $B_{-1y}$ of ±1 ordered diffracting light in y direction are formed on the recording medium. In this case, the diffraction angle θx of x direction and the diffraction angle θy of y direction are made equal to each other and thus the interval of spots $B_{+1x}$, $B_{-1x}$ and the interval of spots $B_{+1y}$, $B_{-1y}$ are made equal to each other. Under these conditions, when the return lights of these spots are condensed by the astigmatism optical system having a condenser lens 35 and a cylindrical lens 36 having condensing effect in the x direction as shown in FIGS. 7a, 7b, through the objective lens (not shown), in the condition in which the objective lens is in-focused for the recording medium, respective spots having least circle of confusion are formed on a plane 37 at the middle of front focus and rear focus of the astigmatism optical system, at the positional relation shown in FIG. 8. In this case, in FIG. 8, the spot corresponding to the spot on the recording medium shown in FIG. 6B is shown by the same sign in "'". Therefore, if the light receiving planes of respective light detectors are disposed on the plane 37 formed the least circle of confusion thereon under in-focusing condition, the return light of respective spots can be separated and received on the light receiving plane effectively.

However, defocusing of the objective lens is caused for the recording medium, respective spots formed on the plane 37 become ellipsoidal shape for which major axis direction is rotated to each other in reversible directions in accordance with the defocusing direction. Moreover, As is seen from FIGS. 7a and 7b, irrespective of the diffraction angle θx of x direction and the diffraction angle θy of y direction being made equal to each other, the intervals of fellow diffracting spots on the plane 37 are small in the y direction and large in the x direction. This relation becomes inverted relation if the cylindrical lens 36 is rotated by 90° about its optical axis, that is, the intervals are small in the x direction and large in the y direction. That is, the spot interval of ±1 ordered diffracting lights diffracted in the direction of one axis in which condensing power of the astigmatism optical system is larger than the direction of the other axis, x axis in FIG. 8, becomes larger than the spot interval of ±1 ordered diffracting lights diffracted in the direction orthogonal thereto. In this case, when the intervals of fellow diffracting spots on the light detector become smaller than a magnitude two times the spot diameter, respective spots of 0 ordered light and ±1 ordered diffracting lights are interfered to each other on the light detector, thereby occurring a cross-talk.

In this embodiment, then, as described above, in the focusing controlling range of the objective lens, the direction of the most nearly adjacent beam spots on the optical card 4 is made matched substantially with the minor axis direction of ellipsoidal shape of the return light beam formed by the astigmatism optical system at proximal side thereof. According to such a configuration, in FIG. 3, for example, in spots 21a–21c, 22b, 22f, the interval of spots 22b, 22f is small and the interval of the other spots is wide, but on the light detector 16, as shown in FIG. 9, the interval of spots 22b', 22f' corresponding to the spots 22b, 22f becomes wide slightly, and the interval of spots 21b', 21c' corresponding to the spots 21b, 21c becomes narrow slightly. Respective spots 21a'–21c', 22b', 22f' become ellipsoidal shape having minor axis in the direction of most adjacent spots 22b, 22f on the optical card 4, as shown by solid line, at the proximal side of the astigmatism optical system, and become ellipsoidal shape having major axis in the direction of spots 22b, 22f inversely, as shown by dotted line, at the distal side of the astigmatism optical system. In FIG. 9, spot 21a' shows a spot on the light detector 16 corresponding to the spot 21a on the optical card 4.

Therefore, as described above, if the interval L of adjacent spots S1, S2 on the recording layer 31 satisfies the following condition: L>l with minimum, in the range of focusing control of the objective lens 3, the return light of the plural light beams irradiated on the optical card 4 can be separated and received effectively on respective corresponding light receiving elements of the light detector 16, without making the diffracting angles of the diffraction grating 6 and diffracting optical member 10 large more than necessary and making the focal length of the objective lens 3 long, and thus the occurrence of undesired cross-talk can be prevented effectively.

In the above described embodiment, the light beam emitted from the recording semiconductor laser 1 is used to perform focusing control and tracking control, but in FIG. 1, the diffraction grating 6 for 3 beams can be arranged in an optical path between the ½ wave plate 9 and the diffracting optical member 10, thereby performing tracking control with the light beam emitted from the reproducing semiconductor laser 2 and thus performing focusing control with the light beam emitted from the recording semiconductor laser 1. Also, the present invention is not limited to the above multi-track read and one track write system, but can be applied to one track read-write, multi-track read only or one track read only system effectively.

In this embodiment, in FIG. 1, respective optical members are arranged in such a manner that the optical axis of collimators 5, 8 are not parallel to respective seeking directions, so as to be able to adjust these collimator lenses in respective optical axis directions and, can be held elastically to regulate the movement in the directions orthogonal to the optical axis.

FIGS. 13a and 13b are a plan view and a front view each showing a construction of a holding means of the collimator lens 5. The collimator lens 5 is held and secured to a cylindrical lens frame 61 having a flat surface 61a at its outer periphery portion. A pickup body 62 for attaching the lens frame 61 thereto is formed with stud portions 62a, 62b extending in the direction parallel to the optical axis direction of the collimator lens 5. The lens frame 61 is held by an elastic member 63 such as a leaf spring or the like secured to the stud portion 62b between these stud portions 62a and 62b, so as to be able to move these collimator lenses 5, 8 in respective optical axis directions and, to regulate its movement in the directions orthogonal to the optical axis, thereby pressing the flat surface 61a on the surface of the pickup body 62, and the outer periphery portion to the stud portion 62a, respectively.

One end of the elastic member 63 is secured to positioning recess portions 62c, 62d formed on the upper surface of the stud portion 62b by a screw 64 by engaging a part thereof, and the elastic member 63 is provided with two projections 63a, 63b in such a manner that the other end of the member 63 is pressed on the lens frame 61 at its both ends in the optical axis. The collimator lens 8 is also held to the pickup body 62 elastically by the holding member constructed in the same manner as the above so as to be able to move these collimator lenses 5, 8 in respective optical axis directions, and to regulate its movement in the directions orthogonal to the optical axis.

In this way, the collimators 5, 8 can be held by adjusting its position easily in the optical axis, respectively, and respective optical axes thereof are not parallel to the seeking direction, so that expected optical characteristics can be kept surely by the acceleration of the optical pickup, even if the optical pickup is run away in the seeking direction by some reason or other. Moreover, such expected optical characteristics can also be kept surely even if the optical pickup is abutted to a stopper for regulating a run away (not shown) since the position of respective optical axes does not shift.

The above described holding means is not limited to the collimator lens 5,8, and can be applied effectively as to other optical members included in a movable body capable of being moved in the seeking direction (in this embodiment, whole optical pickup), if the other optical member is elastically held so as to be able to move it in the predetermined direction being the adjusting direction and to regulate its movement in the other direction.

Moreover, in this embodiment, as shown in FIG. 14, the condenser lens 13 is held to a lens frame 65 and the lens frame 65 is secured to the pickup body (not shown), and then the parallel plate 14 and the concave lens 15 held to a common holding member 66 integrally are secured to the pickup body after adjusting its position in the optical axis direction for the optical pickup. The concave lens 15 is held to the holding member 66 so as to incline its optical axis for the optical axis of the condenser lens 13 in order to correct a coma aberration due to the parallel plate.

In such a away, if the parallel plate 14 and the concave lens 15 are held to the con holding member 66 and the member 66 is secured to the pickup body so as to be able to adjust the position in the optical axis for the condenser lens 13, then the holding member 66 can easily be secured adjustably without changing the relative positional relation between the parallel plate 14 and the concave lens 15, and thus so as to form least circle of confusion of the return light on the light detector 16. Also, in order to form the least circle of confusion of the return light on the light detector, the position of the concave lens 15 is adjusted instead of the position adjustment of the condenser lens 13, so that the adjusting range of the holding member 66 can be small because of high adjusting sensitivity, thereby performing effective down-sizing of optical pickup.

In the above embodiment the focusing control and the tracking control are performed by using the light beam from the recording semiconductor laser 1, but in FIG. 1, the diffraction grating 6 is omitted, a three beam diffraction grating 6 is arranged in an optical path between the ½ wave plate 9 and the diffracting optical member 10, thereby performing the tracking control by using the light beam from the semiconductor laser 2, and performing focusing control by using the light beam from the semiconductor laser 1. In this case, also, the three beam diffraction grating is formed with the 112 wave plate integrally, or further with diffraction grating integrally, thereby intending a decrease of the number of components.

The present invention is not limited to the above described multi-track read and one track write type, and but effectively be applied to the case of one track read and one track write type, or one track read only type.

FIG. 10 shows a second embodiment of an optical pickup according to the present invention. In this embodiment, the light pickup is one track read-write type. The light beam emitted from a recording/reproducing semiconductor laser 41 is made parallel light flux by a collimator lens 42 and entered into a diffraction grating 43, thereby obtaining one recording/reproducing main beam (0 ordered light) and two tracking sub-beams (±1 ordered diffraction lights). These three beams are irradiated on the optical card in the spot by an objective lens (not shown) through a plane prism 44 for separating inward and outward paths and a 90° reflected mirror 45.

The return light reflected on the optical card is entered to the plane prism 44 through the objective lens and the 90° reflected mirror 45, the return light reflected therefrom and separated from the inward path is entered into a light detector 49 through a condenser lens 46, plane plate 47 and a concave lens 48, same as in the first embodiment.

FIG. 11 shows a relative positional relation between the spots due to the light beam from the semiconductor laser 41 formed on the optical card, in this embodiment. In FIG. 11, a spot 51a on an optical card 50 shows a spot due to the main beam, and spots 51b and 51c show due to two sub-beams. Spots 51a–51c are positioned in such a manner that the spots 51b, 51c are respectively positioned on an edge at one side of and an edge at the other side of a guide track 50b apart from few tracks across required track 50a diagonally, under the condition that the spot Sa is positioned on the required track 50a of the optical card 50 by the tracking control. Even in this embodiment, also, adjacent spot interval L satisfies following equation as explained in FIG. 5, L>l.

FIG. 12 is a plan view showing a construction of light receiving plane of the light detector 49 shown in FIG. 10. This light detector 49 comprises a light receiving section 52 for receiving the return lights from the spots 51b, 51c respectively, and light receiving elements 53a, 53b for receiving the return lights 51b, 51c respectively, and is formed on the same semiconductor substrate. In this embodiment, also, the direction of adjacent spots is made substantially matched to the minor axis direction of the ellipsoidal beam shape of the return light of spot formed at proximal side by an astigmatism optical system due to the condenser lens 46 and the plane-plate 47.

In such a way, as in the above embodiment, while obtaining the focusing error signal for focus-controlling the objective lens by astigmatism method in accordance with outputs of four-divided light receiving elements 54a–54d of the light receiving section 52, and while obtaining tracking error signal for track-controlling the objective lens in accordance with three beam method, in recording mode, the light power of the spot 51a is modulated to the recording power from the reproducing power in accordance with recording information, thereby recording the information on the track 50a on which the spot 51a is positioned, and in reproducing mode, the information recorded on the track 50a on which the spot 51a is positioned, is reproduced in accordance with a sum of outputs of the four divided light receiving elements 54a–54d by using light power of the spot 51a as a reproducing power.

Therefore, even in this embodiment, in the range of focusing control of the objective lens 3, the return light of the three light beams irradiated on the optical card can be separated and received effectively on respective corresponding light receiving elements of the light detector 49, without making the diffracting angles of the diffraction grating 43 large more than necessary and making the focal length of the objective lens long , and thus the occurrence of undesired cross-talk can be prevented effectively.

The present invention is not limited to the above described embodiment, and various modifications or changes thereof can be applied. For example, in the above embodiment, the astigmatism optical system is formed by the condenser lens and the parallel plate, instead thereof other optical elements such as a cylindrical lens and toric lens can be used. In the pickup shown in FIG. 10, the semiconductor laser 41 is changed to a reproducing semiconductor laser as in the same as the semiconductor laser 2 shown in FIG. 1, thereby forming 1-track read only pickup. Moreover, the present invention is not limited to the optical card, but can be applied to a pickup for performing the recording and the reproducing of information for other recording medium such as an optical disc or the like.

Figure 15:
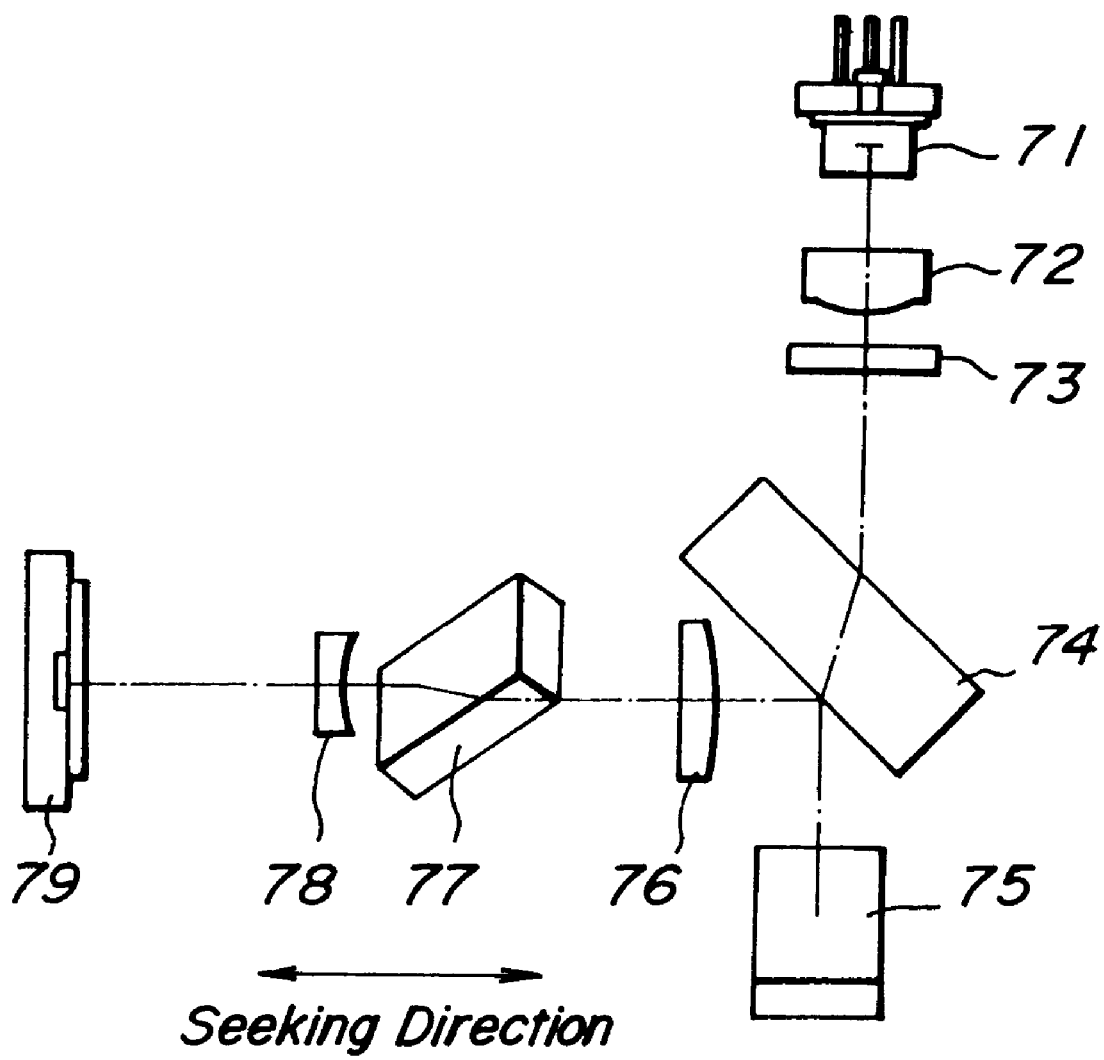
FIG. 15 is a side view showing third embodiment of the optical pickup according to the present invention.

FIG. 15 shows a third embodiment of an optical pickup which shows one track read only type, according to the present invention. In this embodiment, the light beam emitted from the reproducing semiconductor laser 71 is made parallel light flux by a collimator lens 72, and then entered into a diffraction grating 73 to obtain one reproducing main beam (0 ordered light) and two tracking sub-beams (±1 ordered diffraction lights).

These three beams are irradiated on an optical card in the spot shape by the objective lens (not shown) through a plane prism 74 for separating inward way and outward way to each other, and a 45 degree mirror 75.

The return beam reflected from the optical card is irradiated on the plane lens 74 through the objective lens and the 45 degree mirror 75, and the return beam reflected thereon and separated from the inward way is entered on an light detector 79 through a condenser lens 76, a plane prism 77 and a concave lens 78 in the same manner as the first embodiment.

In this embodiment, also, respective incident angles, at which the light beam from the semiconductor laser 71 and the return light from the optical card are incident on respective corresponding planes of the plane prism 74, does not become 0°, so that stray light can effectively be prevented from being occurred at respective incident planes of the plane prism 74 in the same manner as the first embodiment.

Figure 16:
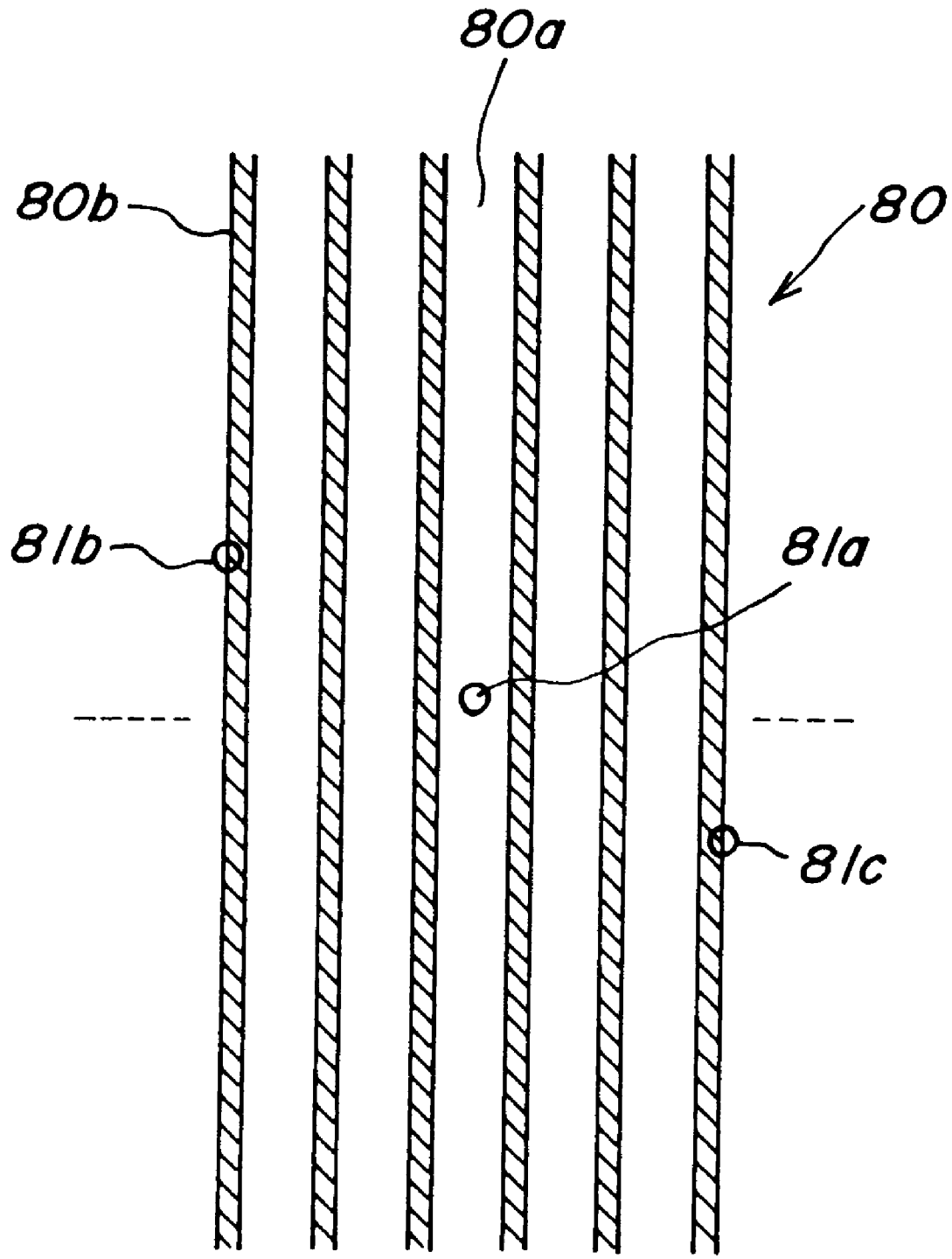
FIG. 16 is an explanatory view showing relative positional relation of beam spot and track on the optical card shown in FIG. 15.

FIG. 16 shows the relative positional relations between the spots due to the light beam from the semiconductor laser 71 formed on an optical card and a track in this embodiment. In FIG. 16, a spot 81a on an optical card 80 shows a spot due to the main beam and spots 81b and 81c show spots due to two sub-beams. The spots 81a–81c are positioned in such a manner that the spots 81b, 81c are respectively positioned on an edge at one side of and an edge at the other side of a guide track 80b apart from few tracks across required track 80a diagonally, under the condition that the spot 81a is positioned on the required track 80a of the optical card 80, by the tracking control.

Figure 17:
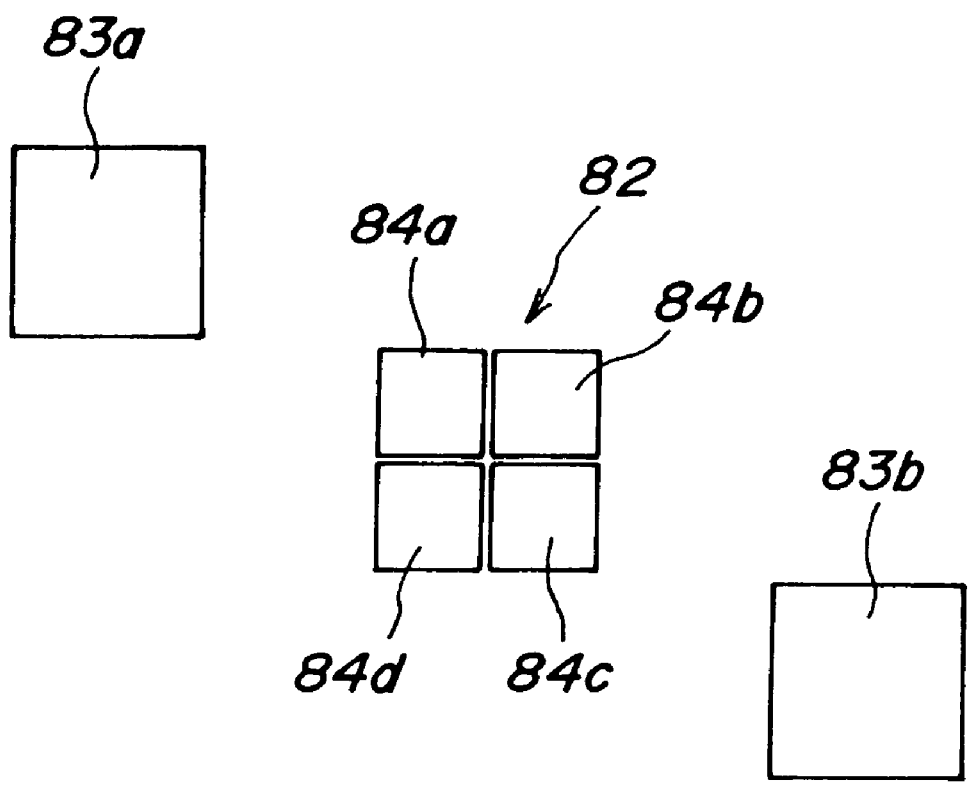
FIG. 17 is a plan view showing a construction of light receiving plane of the light detector shown in FIG. 15.

FIG. 17 is a plan view showing a construction of light receiving plane of the light detector 79 shown in FIG. 15. The light detector 79 comprises a light receiving section 82 for receiving the return light from the spot 81a shown in FIG. 16, and light receiving sections 83a, 83b for receiving the return light from spots 81b, 81c, and these light receiving sections are formed on the same semiconductor substrate integrally. Light receiving section 82 is constructed by four-divided light receiving sections 84a–84d.

In such a way, a focusing error signal is obtained for controlling the objective lens by astigmatism method in accordance with outputs of 4-divided light receiving regions 84a–84d of the light receiving section 82, and a tracking error signal is obtained for controlling the tracking of the objective lens by three-beam method in accordance with outputs of light receiving sections 83a, 83b. Moreover, the information recorded on the track 81a on which the spot 81a is positioned, is reproduced in accordance with the sum of outputs of four-divided light receiving sections 84a–84d.

In this embodiment, also, respective optical members are arranged in such a manner that the optical axis of collimator 72 is not parallel to the seeking direction, so as to be able to adjust the collimator lens in optical axis direction by the same construction as the holding means shown in FIG. 13, and, can be held elastically to regulate the movement in the direction orthogonal to the optical axis. Moreover, the parallel plate 77 and the concave lens 78 are held to a common holding member integrally in the same manner as in FIG. 14 and the common holding member is secured to the pickup body so as to be able to adjust the position in the optical axis for the condenser lens 76.

Therefore, in this embodiment, also, the positional shift in the optical axis of the collimator 72 due to the run away of the optical pickup can effectively be prevented, so that expected optical characteristics can be kept surely. Moreover, the parallel plate 77 and the concave lens 78 can be positioned with favorable precision for the light detector 79 under the condition that the coma aberration of the plane plate 47 is corrected effectively, thereby performing effective down-sizing of optical pickup.

The present invention is not limited to the above described embodiment, but various modifications or changes can be possible. For example, in the above embodiment, the present invention describes an optical pickup of a unit type in which whole optical pickup can be moved in the seeking direction, but the present invention can effectively be applied to an optical pickup of separation type in which a part of the optical pickup can be moved in the seeking direction. Also, in the above embodiment, the astigmatism is given to the return light with the use of the parallel plate in order to detect the focusing error signal, but the astigmatism can also be given to the return light with the use of cylindrical lens, instead of the parallel plate. Moreover, in the optical pickup shown in FIG. 15, the semiconductor laser 71 is changed to the same semiconductor laser as the semiconductor laser shown in FIG. 1, thereby forming the optical pickup of one track read and write type. The present invention is not limited to the optical card, but can effectively be applied to an optical pickup, by which the recording and the reproducing of the information is performed for other recording medium such as an optical disc.

Figure 18:
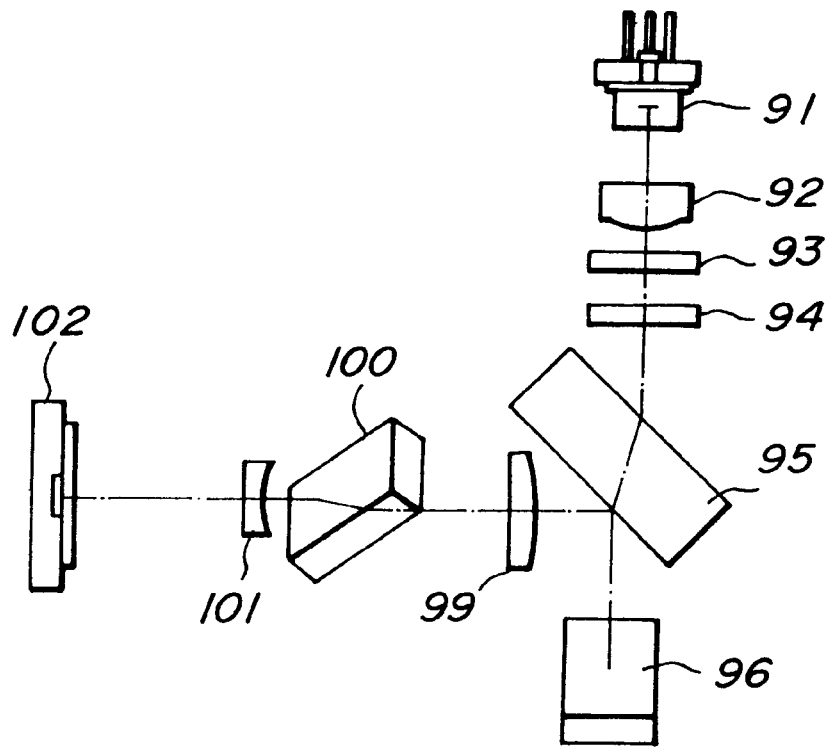
FIG. 18 a plan view showing fourth embodiment of the optical pickup according to the present invention.

FIG. 18 shows a first mode of a fourth embodiment of the optical pickup according to the present invention. In this embodiment, the optical pickup is the read-only pickup which can read successive three tracks of the optical pickup simultaneously. The light beam emerged from a reproducing type semiconductor laser 91 is made parallel luminous or light flux by a collimator lens 92, and then is irradiated and diffracted on a first diffraction grating 93, thereby obtaining three light beams having 0 ordered light and ±1 ordered diffraction lights with equal light quantity ratio. These three light beams are entered into a second diffraction grating 94 and diffracted in the direction different from the diffracting direction of the first diffraction grating 93, thereby obtaining three light beams each having 0 ordered light and ±1 ordered diffraction lights, accordingly 9 light beams in total. The diffraction grating 94 is used as a diffraction grating in above write type optical pickup having light amount ratio of −1 ordered diffraction light, 0 ordered light and +1 ordered light being, for instance, 1:16:1. 0 ordered light is used as the reading beam and ±1 ordered diffraction lights are used as the tracking beam.

Figure 19:
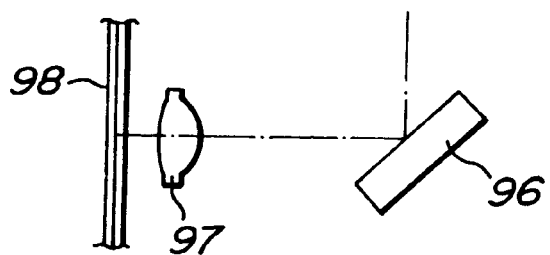
FIG. 19 is a partial side view of FIG. 1.

The plural light beams emerged from the second diffraction grating 94 are irradiated on an optical card 98 in spot shaped by an objective lens 97 as a collecting or condensing means through a plate prism 95 for separating an inward path and an outward path from each other and a standing mirror 96 as shown in a partial side view of FIG. 19.

Moreover, the return light reflected by the optical card 98 is entered on the plane prism 95 through the objective lens 97 and the standing mirror 96, so that the return light reflected thereon and separated from the inward path, is entered as a converged light to the plane-parallel plate 100 which is arranged at a inclination of 45° against the optical axis (45° against the tracking direction, also) through a condenser lens 99, and is refracted and transmitted by said plane-parallel plate 100 so that the astigmatism for detecting the focusing error is occurred to incident to the light detector 102 through a concave lens 101.

FIG. 20 describes the relative positional relation between the spots due to the light beam from the semiconductor laser 91 formed on the optical card 98 and the track. In FIG. 20, spots 111, 112, 113 show the spots for read by 0 ordered lights at the second diffraction grating, corresponding to each of three light beams obtained from the first diffraction grating. Spots 111a, 112a, 113b show the spot for tracking, for instance, by +1 ordered diffraction light and spots 111b, 112b, 113b show the spot for tracking, for example, by −1 ordered diffraction light, respectively.

Reading spots 111, 112, 113 are to be placed on three tracks 117a, 117b, 117c successively, in the state that tracking spots 111a, 112a, 113a are located at the edge of one side of several different guide tracks 115a, 115b, 115c and tracking spots 111b, 112b, 113b are located at the edge of the other side of several different guide tracks 116a, 116b, 116c through the tracking control.

FIG. 21 is a plan view showing the construction of a light receiving plane of the light detector 92 shown in FIG. 18. The light detector 92 is constituted by forming the light receiving elements 121, 122, 123, which receive the return light from reading spots 111, 112, 113, respectively and the common light receiving element 124, which receives the return light from tracking spots 121a, 112a, 113a, and the common light receiving element 125, which receives the return light from the tracking spots 111b, 112b, 113b shown in FIG. 20, on the same semiconductor substrate. Incidentally, light receiving elements 121, 122, 123 are comprised of the four-divided light receiving sections 122a–122d. Herein, a first light receiving means is comprised of the light receiving elements 121, 122 and 123 and a second light receiving means is comprised of the light receiving elements 124 and 125.

In such a way, the focusing error signal Fo for focus-controlling the object lens 97 is obtained through astigmatism, with based on the outputs of four-divided light receiving sections 122a–122d of the light receiving element 122. Supporsing the outputs of light receiving sections 122a–122d are set to be $I_{52a}$–$I_{52d}$, the focus error signal Fo is obtained as follows:

$$Fo=(I_{52a}+I_{52c})-(I_{52b}+I_{52d})$$

Moreover, the tracking error signal Tr for track-controlling the object lens 97 is obtained through 3 beam method, with based on the outputs of the light receiving elements 124 and 125. Supporsing the outputs of light receiving sections 124 and 125 are set to be $I_{54}$, $I_{55}$, the tracking error signal Tr is obtained as follows:

$$Tr=I_{54}-I_{55}$$

Furthermore, the read signals of successive three tracks 117a, 117b, 117c are obtained, based on the outputs of light receiving elements 121, 122, 123, while performing the focusing control and the tracking control for the tracking the object lens 97 in accordance with above focus error signal Fo and the tracking error signal Tr.

In this mode of the fourth embodiment, as described above, the second diffraction grating 94 uses the light amount ratio of −1 ordered diffraction light, to 0 ordered light, and to +1 ordered diffraction light, which are used at the write type optical pickup, is 1:16:1, for instance. Therefore, in this case, the ratio of light quantity of the tracking spot 112a, to light quantity of the read spot 112 which corresponds to light receiving section of the light receiving element 122, and to the light aunt of tracking spot 112b is 1:4:1. Furthermore, the light amount ratio for other spots, that is, tracking spot 111a: reading spot 111: tracking spot 111b and tracking spot 113a: reading spot 113: tracking spot 113b is 1:16:1.

However, in this mode, since the return light, which is from three tracking spots 111a, 112a, 113a located at the edge of one side of the track, is received by the common light receiving element 124 and the return light, which is from three tracking spots 111b, 112b, 113b located at the edge of the other side of the track, is received by the common light receiving element 125, the light amount ratio which corresponds to the light receiving element 124, one light receiving section of light receiving element 122 and the light receiving element 125 is 3:4:3, so that the light quantity for detecting the focus error signal and the light quantity for detecting tracking error signal can be almost equal.

Therefore, using an I/V converter and an operating device, which dynamic range are relatively narrow as usual, each output current of the light receiving elements 121, 123, 124, 125 and the light receiving sections 122a–122d can be converted to the voltage so that the diffraction grating can be shared with the write type optical pickup, so as to obtain the low price multi track read type optical pickup without adding the special modification on the usual constitution of the circuit.

Figure 22:
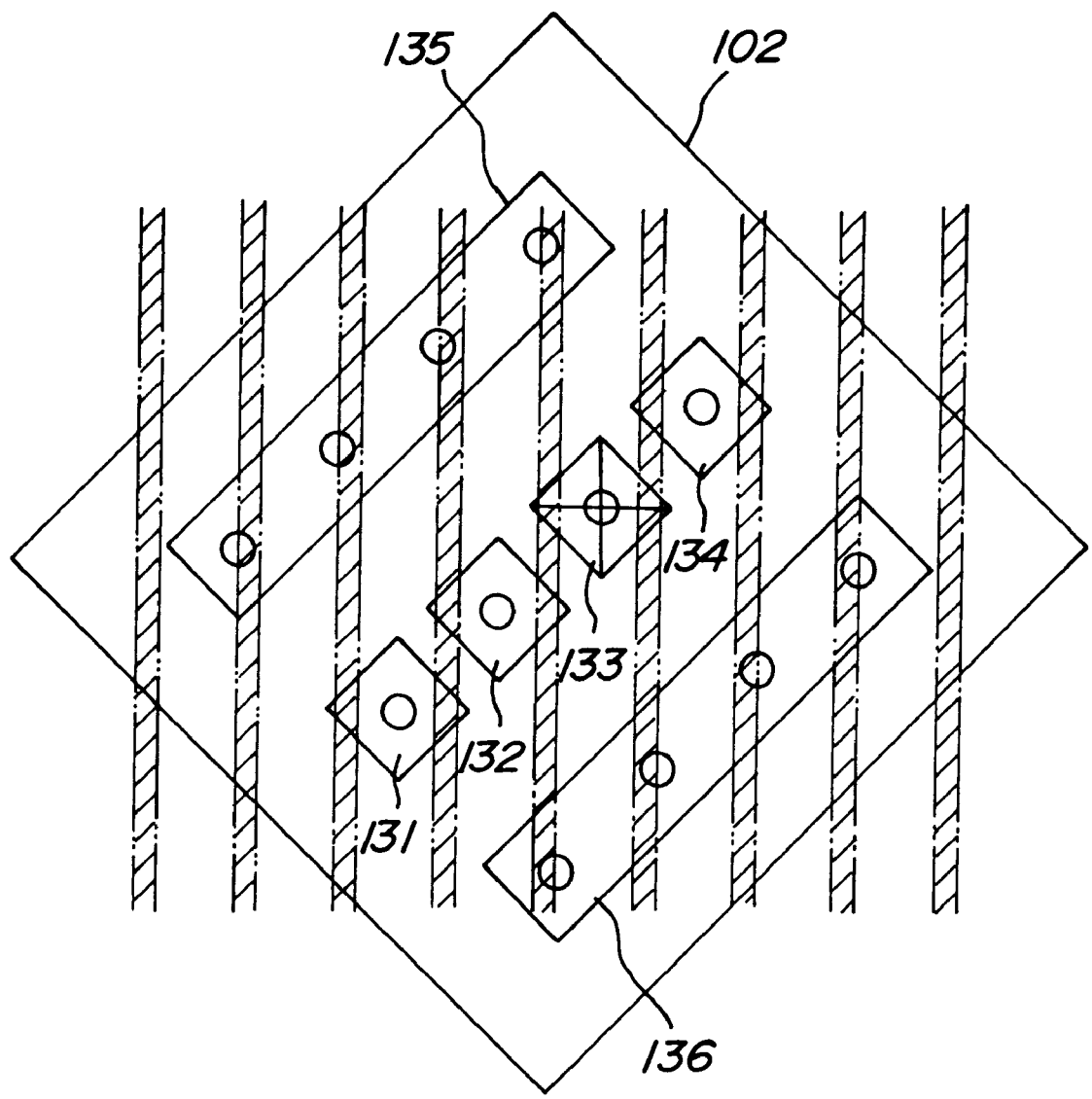
FIG. 22 is an explanatory view explaining the essential part of the modification of fourth embodiment shown in FIG. 19.

FIG. 22 describes the constitution of the essential part of a second mode as one modification of the fourth embodiment according to the present invention. In this modification, in the constitution shown in FIG. 18, the four light beams which have equal light amount ratio through the first diffraction grating 93, in which these light beams are entered into the second diffraction grating 94, three light beams, 0 ordered light and ±1 ordered diffraction lights severally, accordingly 12 light beams in total, are obtained, so that four tracks can be read simultaneously with each 0 ordered light as reading beams and ±1 ordered diffraction lights as tracking beam. For this modification according to the present invention, as shown in FIG. 22, the light detector 102 is comprised by forming the light receiving elements 131, 132, 133, 134, which receive the return lights from the optical cards of four beams for reading, and a common light receiving element 135, which receives the return light from the optical card of four +1 ordered diffraction lights, for instance, at the second diffraction grating 94, that is the tracking beam and similarly the common receiving element 136, which receives the return light from the optical card of four −1 ordered diffraction light, at the second diffraction grating 94, that is a tracking beam on the same semiconductor substrate. Furthermore, any one of the light receiving elements 131, 132, 133, 134, the receiving light element 133 in FIG. 22, is comprised of the four-divided light receiving means to detect the focus error signal through the astigmatism method. Here, the light receiving elements 131, 132, 133, 134 are comprised of a first light receiving element and the light receiving elements 135, 136 are comprised of the second light receiving means.

Likewise the first mode, the focusing error signal Fo is detected through the astigmatism, based on the outputs of the four-divided light receiving sections of the light receiving element 133 and the tracking error signal Tr is obtained through 3 beam method, based on the outputs of the light receiving elements 135, 136 so that based on said focus error signal Fo and the tracking error signal Tr, controlling the focus and the tracking, the reading signal of successive four tracks is obtained, based on the outputs of light receiving elements 131, 132, 133, 134.

According to this mode, the light amount ratio which corresponds to the light receiving element 135, one light receiving section of the light receiving element 133 and the light receiving element 136 is 4:4:4, so that the light amount to detect the focus error signal and the light amount to detect the tracking error signal can be equal. Therefore, the detecting accuracy of the focus error signal and the tracking error signal can be more equal than that in the first of the fourth embodiment.

Figure 23:
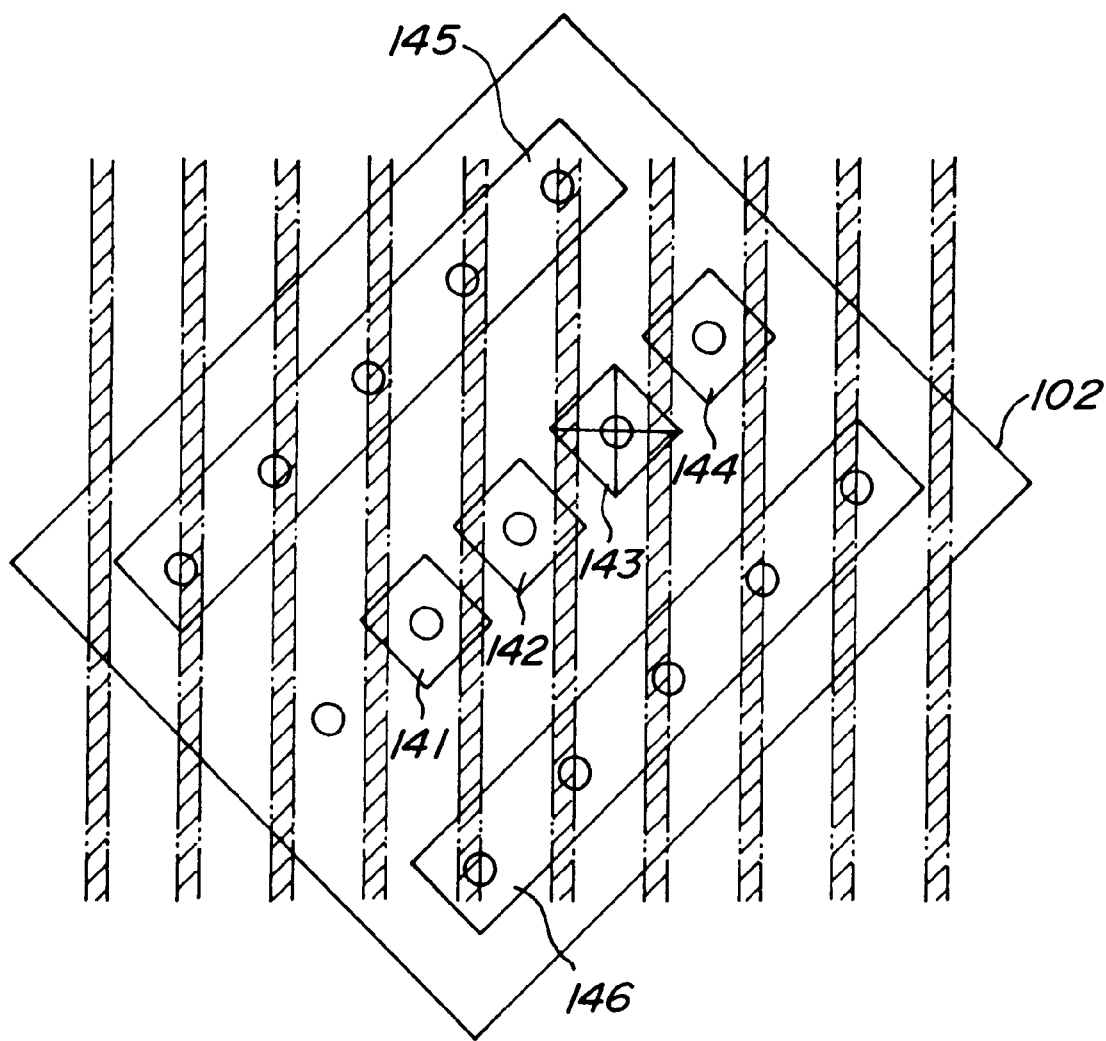
FIG. 23 is an explanatory view explaining the essential part of further modification of fourth embodiment shown in FIG. 19.
Figure 24:
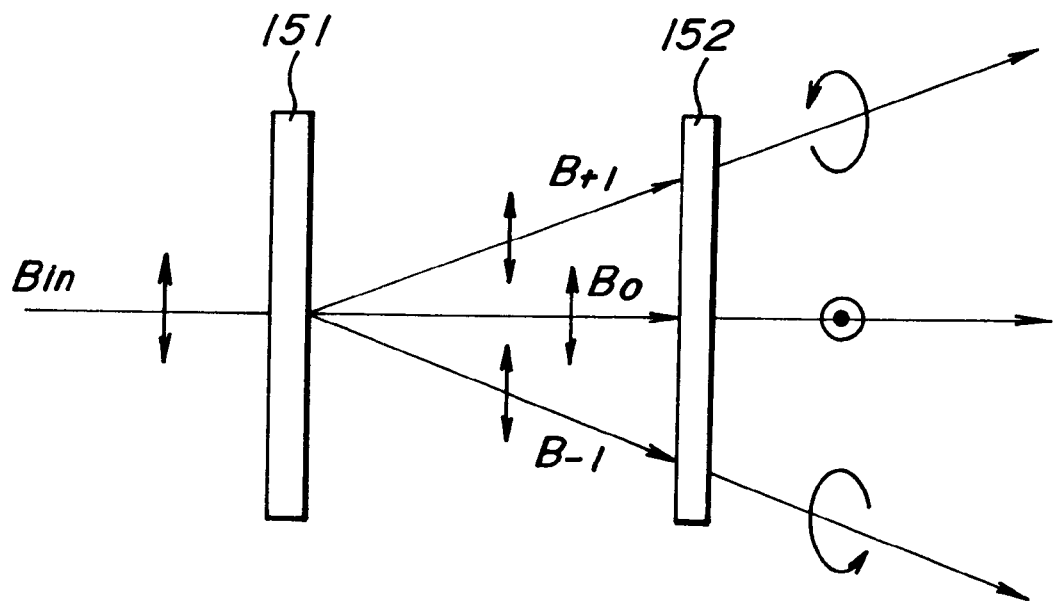
FIG. 24 is an explanatory view showing the problem of conventional optical pickup.

FIG. 23 describes the constitution of the main part of the third mode as another modification of the fourth embodiment. In the constitution shown in FIG. 18 of this modification, five light beams which light amount ratio is equal, are obtained through the first diffraction grating 93 and said light beams are entered into the second diffraction grating 94 so that several three light beams comprising of 0 ordered light and ±1 ordered diffraction lights, 15 light beams in total, are obtained, then four tracks can be read simultaneously with each 0 ordered light as beams for reading and ten ±1 ordered diffraction light for tracking. Accordingly, in this mode, as shown in FIG. 23, the light detector 102 is comprised by forming the light receiving elements 141, 142, 143, 144 which receive the return light from the optical card of four reading beams respectively and the common light receiving element 145, which receives the return light from the optical card of, for instance, +1 ordered diffraction, light at the second diffraction grating 94, that is the tracking beam and the common light receiving element 146, which receives the return light from the optical card of five −1 ordered diffraction light at the second diffraction grating 94, that is tracking beam likewise, on the same semiconductor substrate. Moreover, any one of light receiving elements 141, 142, 143, 144, the light receiving element 143 in FIG. 23, is comprised of the four-divided light receiving sections to detect the focus error signal also through the astigmatism method. Here, the light receiving elements 141, 142 are comprised of a first light receiving means and the light receiving elements 145, 146 are comprised of a second light receiving means.

Likewise the first mode, the focusing error signal Fo is detected through the astigmatism, based on the outputs of the four-divided light receiving sections of the light receiving element 143 and the tracking error signal Tr is obtained through the 3 beam method, based on the outputs of the light receiving elements 145, 146 so that based on the focus error signal Fo and the tracking error signal Tr, controlling the focus and the tracking, the reading signal of the successive four-divided tracks are obtained, based on the output of the light receiving elements 141, 142, 143, 174.

According to this mode, the light amount ratio which corresponds to the light receiving element 145, one light receiving range of the light receiving element 143 and the light receiving element 146, is 5:4:5 so that the light amount to detect the focus error signal and the light amount to detect the tracking error signal are almost equal likewise the first mode so as to obtain the same effect as the first mode.

As above, the fourth embodiment of the present invention is explained by three modifications and in the following the way to think about the invention is explained in a generalized way. Although the light amount ratio of −1 ordered diffraction light, 0 ordered light and +1 ordered diffraction light which are obtained at the second diffraction grating, was indicated as 1:16:1, it is generalized as 1:x:1. Here, although x is 1 and over, it is not necessary to be a natural number. Moreover, regarding above three modes, although the light receiving element, which detects the focus error signal, is divided into four parts, it is generalized to be divided into n (however, n is any natural number except 1) part. Next, into two light receiving elements, which detect the tracking error signal with using −1 ordered diffraction light and +1 ordered diffraction light, obtained at the second diffraction grating, respective three beams at the first mode, respective four beams at the second mode and respective five beams at the third mode are entered. Then, the number of beams entered into respective two light receiving elements is generalized as p (herein, p is any natural number except 1).

Thinking about light detectors which detect the tracking error signal, p beams having the light strength ratio 1 are entered into one of the tracking light detectors, so that the light amount, which is 1×p=p, is entered into the tracking detector. On the other hand, thinking about a light detector which detects the focus error signal, in one of the divided light receiving elements of one of the focusing light detectors, the beam having the light strength ratio x is entered into the focusing detector so that the light amount, which is x/n, is entered into the focusing detector. According to the object of the invention, it is favorable that same amount of light is entered into one of the focusing detector and the tracking detector to use a common I/V converter and the operating device connected to the rear of the light detector for tracking error and the light detector for focus error. In brief, it is favorable that p and x/n are almost same. In other words, it is favorable to select each value for p, x, n so as to consist nearly p=x/n.

Besides, it is possible to modify or change the invention in many ways, not only to be restricted to above modes of the fourth embodiment. For instance, regarding above modes, as the second diffraction grating 94, although the diffraction grating obtaining a beam for writing and two beams for tracking from a light beam which is used for the optical pickup for writing, for example, if the con mask pattern which is used when said diffraction grating for writing is manufactured is used, it is possible to form the first diffraction grating 93 in the surface of an optical base material and to form the second diffraction grating 24 in the rear face. As described above, because of using the common mask pattern, it is possible for the diffraction grating to be lower price and for the number of members to be reduced so that the whole price can be lower and the assembling can be easier. Moreover, it is possible to effectively apply said invention not only to the optical card but the optical pickup carrying out the multi-track reading to other record medium, such as the light disc or the like.

What is claimed is:

1. An optical pickup comprising a plurality of light sources for generating recording and reproducing light, including a light beam, for recording and reproducing information on and from a recording medium, a plurality of optical elements for treating the light beam generated from the light sources, light detecting means for detecting the light beam in an optical path to adjust characteristics of the light beam, wherein resolution or resolving power of said light beam in a recording time and in a reproducing time is adjusted to match each other.

2. An optical pickup comprising:
   two semiconductor lasers disposed in a same plane so as to each emit a linearly polarized beam having an ellipsoidal cross-sectional shape with an oscillating plane which is coplanar therewith, a ½ wave plate for rotating a polarizing plane of the light beam from one semiconductor laser substantially 90°, and a polarization beam splitter for transmitting or reflecting the light beam from one semiconductor laser passing through the ½ wave plate and for reflecting or transmitting the light beam from the other semiconductor laser passing through the ½ wave plate to compose these beams in substantially the same optical path, wherein the respective light beams composed by the beam splitter are illuminated on a recording medium through an objective lens, and the ellipsoidal sectional shape of one respective beam is matched to the ellipsoidal sectional shape of the other respective beam.

3. An optical pickup for irradiating a plurality of light beams on a recording medium through a convergence optical system in order to perform at least one of recording and reproducing of information for the recording medium of a multi-layer configuration having a recording layer, wherein: provided that a minimum interval of adjacent spots formed on the recording layer by the plural light beams is L, a thickness and a refractive index of a layer adjacent to the recording layer are d and n, and an effective numerical aperture of the convergence optical system is NA, the following equation is satisfied:

$$L > \tan\{\sin^{-1}(NA/n)\} \times 2 \times d.$$

4. An optical pickup for performing at least one of recording and reproducing of information for a recording medium, said pickup comprising means for irradiating a plurality of light beams on a recording medium through a convergence optical system, light detection means for detecting respective return light beams reflected by the recording medium which are received on the light detection means through an astigmatism optical system, focusing error detection means for detecting focusing error signals indicating relative positional shift between the convergence optical system and the recording medium by an astigmatism method based on an output of at least one light detector of the light detection means, and means for matching the direction of the most nearly adjacent beam spots with the minor axis direction of an ellipsoidal shape of the return light beam formed by the astigmatism optical system at a near side thereof.

5. An optical pickup comprising a movable pickup section for movement in a seeking direction across any tracks of a recording medium, an optical member provided on the recording medium in order to perform at least one of recording and reproducing of information for the recording medium, and a holding member for holding the optical member so that the optical member is displaceable in a predetermined adjusting direction different from the seeking direction and is restricted in the direction orthogonal to the adjusting direction.

* * * * *